United States Patent [19]
Sugimoto et al.

[11] Patent Number: 5,808,700
[45] Date of Patent: Sep. 15, 1998

[54] MOTION VIDEO CODING SYSTEMS WITH MOTION VECTOR DETECTION

[75] Inventors: Etsuko Sugimoto, Tokyo-to; Takashi Urano, Matsudo; Satoko Kobayashi, Yokosuka; Yasuhachi Hamamoto, Kawaguchi; Hideo Kodama, Warabi, all of Japan

[73] Assignee: Sanyo Electric Co., Ltd., Osaka, Japan

[21] Appl. No.: 825,397

[22] Filed: Mar. 28, 1997

Related U.S. Application Data

[62] Division of Ser. No. 425,647, Apr. 20, 1995, Pat. No. 5,650,829.

[30] Foreign Application Priority Data

Apr. 21, 1994 [JP] Japan .................................. 6-83277
Feb. 27, 1995 [JP] Japan .................................. 7-38761

[51] Int. Cl.⁶ .............................. H04N 7/36; H04N 7/50
[52] U.S. Cl. ..................................... 348/699; 348/402
[58] Field of Search .................................. 348/402, 407, 348/413, 416, 420, 421, 699; H04N 7/36, 7/50

[56] References Cited

U.S. PATENT DOCUMENTS

| | | | |
|---|---|---|---|
| 4,460,923 | 7/1984 | Hirano | 348/413 |
| 4,698,672 | 10/1987 | Chen et al. | |
| 5,091,782 | 2/1992 | Krause | 348/402 |
| 5,231,484 | 7/1993 | Gonzales et al. | |
| 5,253,052 | 10/1993 | Hanashiro et al. | |

(List continued on next page.)

FOREIGN PATENT DOCUMENTS

| | | |
|---|---|---|
| 57-199379 | 12/1982 | Japan . |
| 58-101581 | 6/1983 | Japan . |
| 58-107785 | 6/1983 | Japan . |
| 62-271580 | 11/1987 | Japan . |
| 63-148789 | 6/1988 | Japan . |
| 4-323781 | 11/1992 | Japan . |
| 5-137129 | 6/1993 | Japan . |
| 5-252507 | 9/1993 | Japan . |

(List continued on next page.)

OTHER PUBLICATIONS

ISO/IEC 11172–2: 1993 (E), "Information Technology—Coding of Moving Pictures and Associated Audio for Digital Storage Media at up to about 1,5 Mbit/s–" pp. 78–85.

*Primary Examiner*—Howard Britton
*Attorney, Agent, or Firm*—Armstrong, Westerman, Hattori, McLeland & Naughton

[57] ABSTRACT

A motion vector detecting circuit and a motion video compressing system are disclosed. The detecting circuit detect a vector which direct from a spatial location of a current macroblock to a spatial location of a reference macroblock. The detecting circuit includes a first extracting circuit, a second extracting circuit and a searching circuit. The first extracting circuit extracts upper bits from each pixel data of the current macroblock. The second extracting circuit extracts upper bits from each pixel data of the reference frame. The searching circuit searches the upper-bits-extracted reference frame for a macroblock having the strongest correlation with the current macroblock by comparing the upper-bits-extracted current macroblock with the upper-bits-extracted reference frame and outputs the spatial location of the reference macroblock. The motion video compressing system includes the motion vector detecting circuit, a transform-coding circuit, a subtracter, a comparator and a controller. The transform-coding circuit codes inputted data into compressed. The subtracter calculates a difference between each pixel data of the current macroblock and each corresponding pixel data of the reference macroblock directed by the motion vector. The comparator compares an amount of data being obtained by the transform-coding the current macroblock with an amount of data being obtained by the transform-coding the differential macroblock. The controller controls the transform-coding circuit such that the transform-coding circuit outputs which of the compressed current macroblock and the compressed differential macroblock has a smaller amount of data.

17 Claims, 24 Drawing Sheets

U.S. PATENT DOCUMENTS

| | | |
|---|---|---|
| 5,293,229 | 3/1994 | Iu . |
| 5,325,125 | 6/1994 | Naimpally et al. . |
| 5,379,076 | 1/1995 | Song ........................................ 348/699 |
| 5,650,829 | 7/1997 | Sugimoto ............................... 348/699 |

FOREIGN PATENT DOCUMENTS

| | | |
|---|---|---|
| 5-276502 | 10/1993 | Japan . |
| 6-22199 | 1/1994 | Japan . |
| 6-133301 | 5/1994 | Japan . |
| 6-225284 | 8/1994 | Japan . |

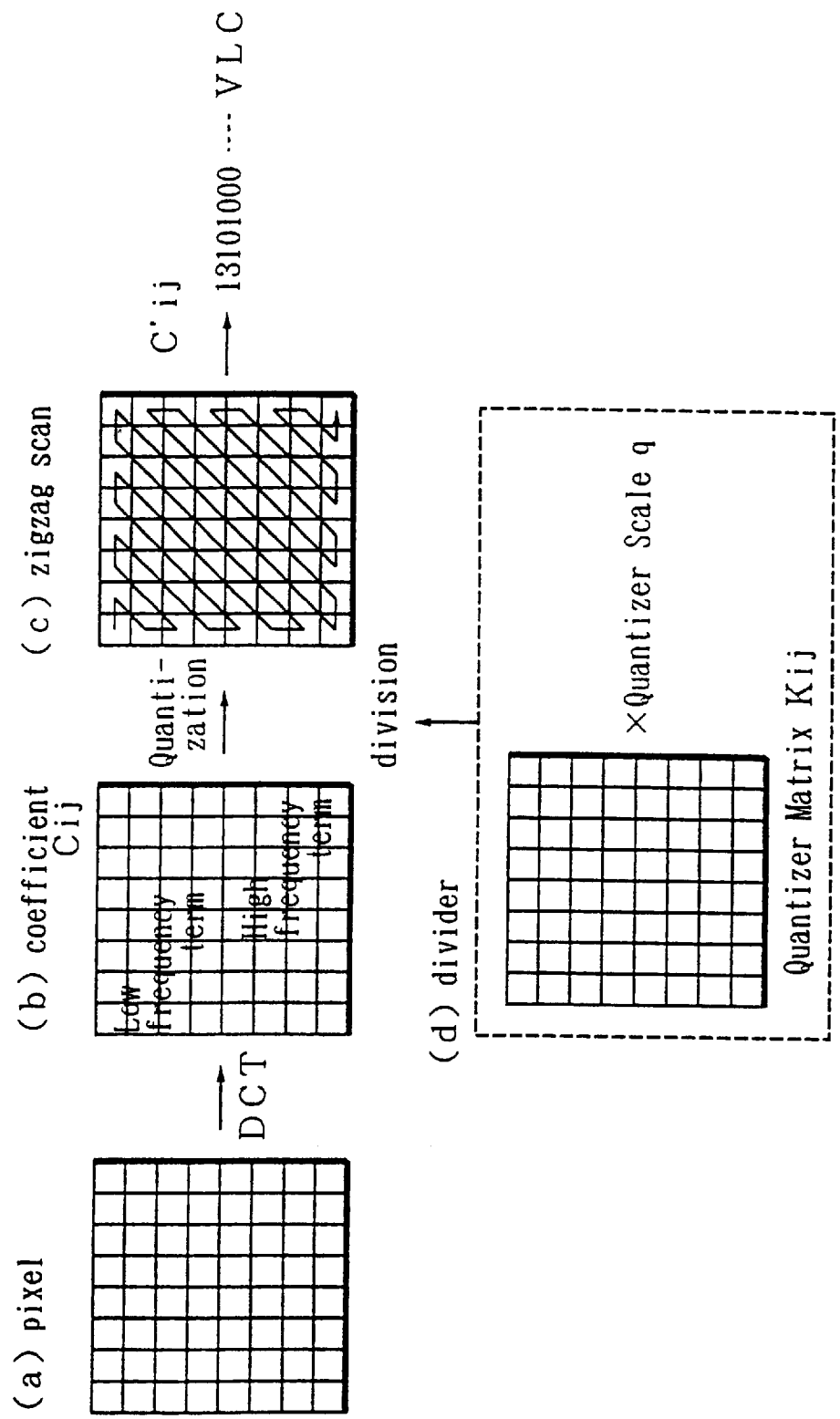

FULL SEARCH

LOGARITHMIC SEARCH

TELESCOPIC SEARCH

A1: A REGION DIRECTED BY A PRIOR MOTION VECTOR

PRIOR FRAME — LARGE CORRELATION (inter frame), LARGE CORRELATION (IN FRAME)

CURRENT FRAME — SMALL CORRELATION (IN FRAME)

LARGE CORRELATION (inter frame), LARGE CORRELATION (IN FRAME) → LARGE CORRELATION (IN FRAME)

LARGE CORRELATION (inter frame), SMALL CORRELATION (IN FRAME) → SMALL CORRELATION (IN FRAME)

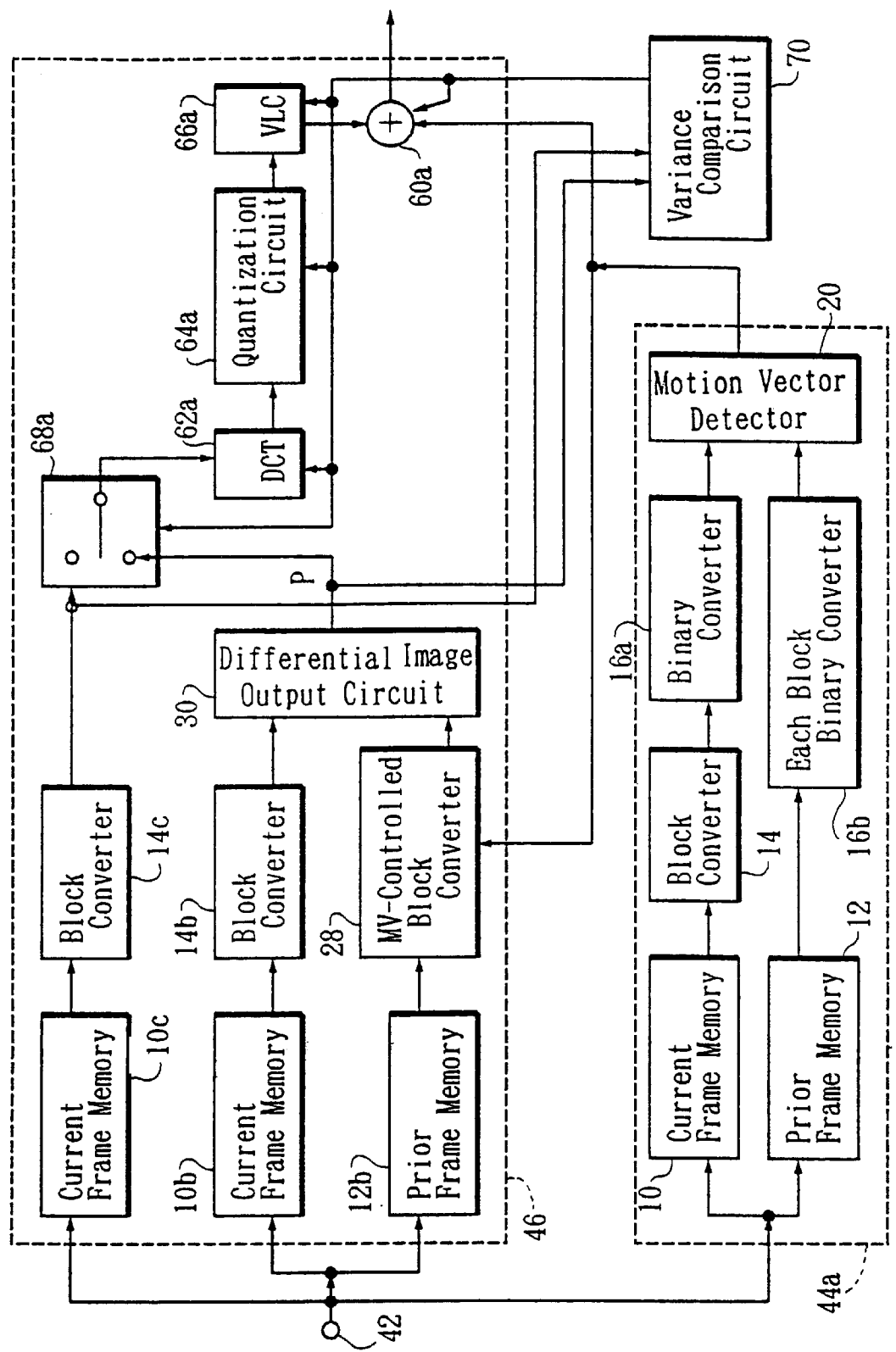

Fig. 17

| Video Sequence | Flower Gardan | Mobile & Calendar | Cheerleaders | Football |
|---|---|---|---|---|
| BIT RATE | 4 Mbps, 9 Mbps | | 4 Mbps | |
| Detecting Region | ± 16 (pixel/frame) | | | |
| Number of Frames | 15 (Frames) | | | |
| Predicting Method | Frame MC, Field MC | | adaptive | |

| Detecting Method | Number of Bits |
|---|---|
| THIS METHOD (TM: NUMBER OF COINCIDENT PIXELS) | 1~7 bit |
| BIT REDUCTION (BR: LOWER BITS DELETE) | 1~7 bit |
| AC PATTERN COMPARISON (AC) | 1 bit |
| FULL SEARCH (FS) | 8 bit |
| TELESCOPIC SEARCH (TS) | 8 bit |

DETECTING METHOD FOR MOTION VECTOR

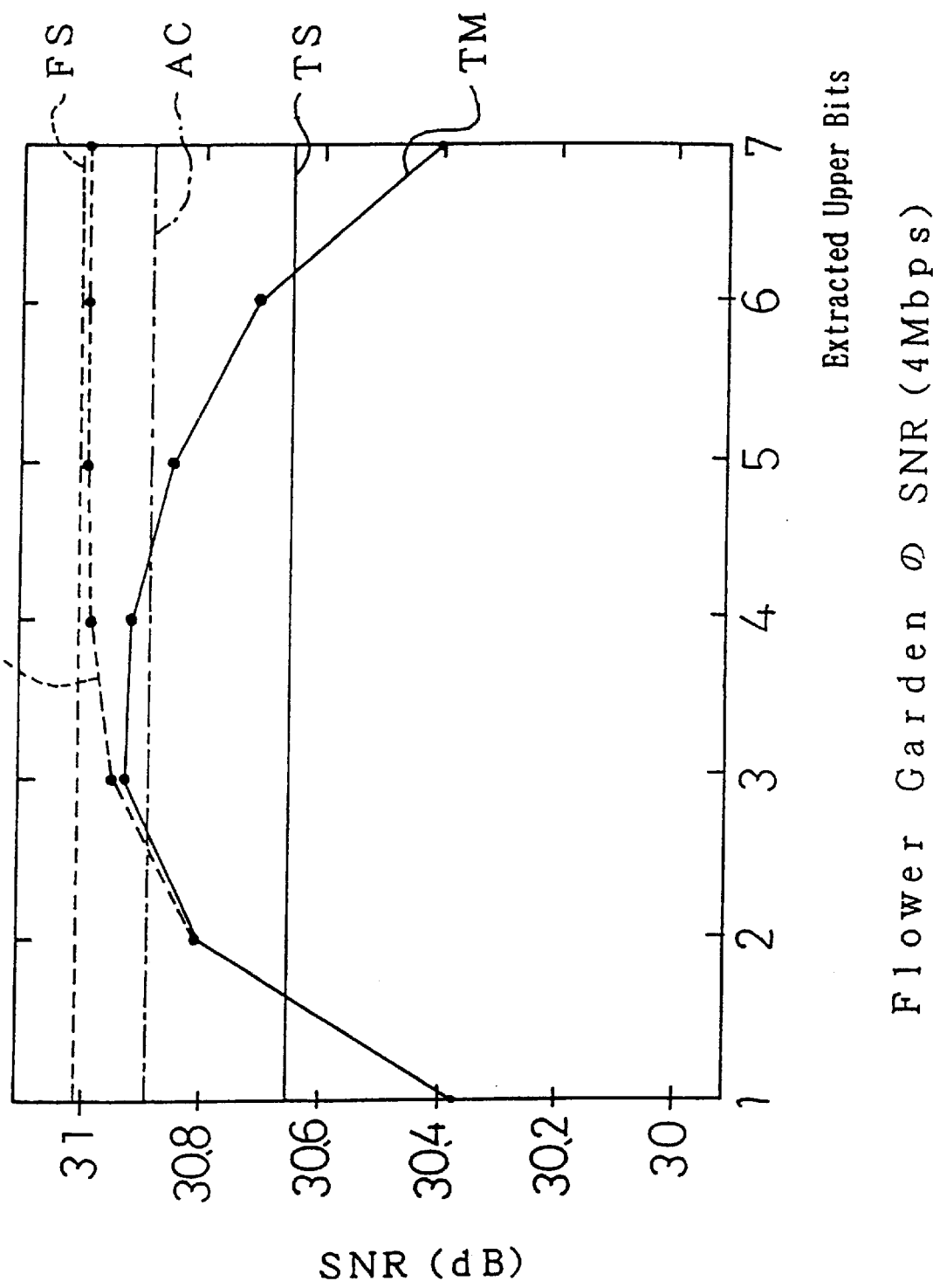

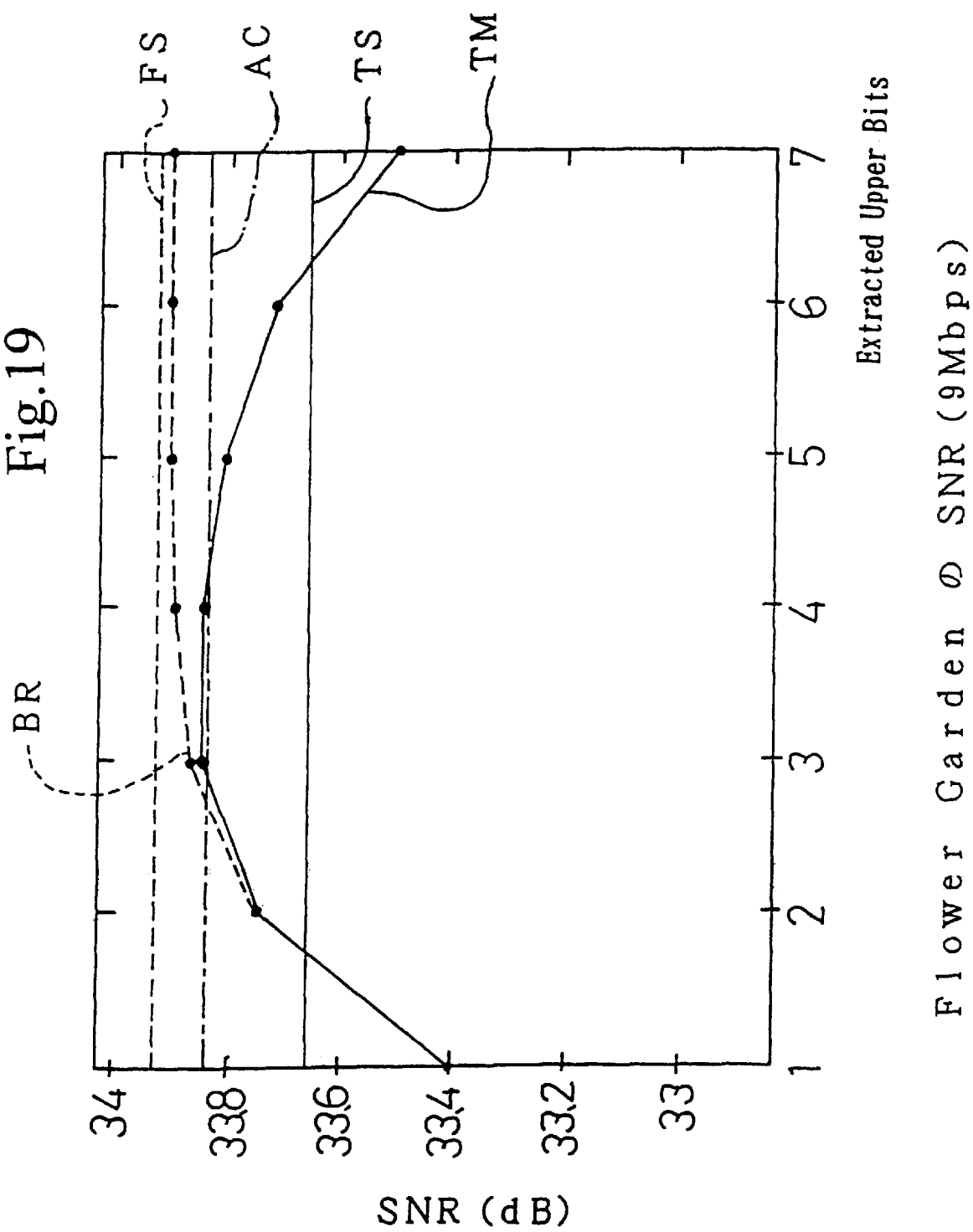
Fig.19 Flower Garden の SNR (9Mbps)

MOTION VIDEO CODING SYSTEMS WITH MOTION VECTOR DETECTION

This is a divisional of application Ser. No. 08/425,647 filed Apr. 20, 1995.

BACKGROUND OF THE INVENTION

1. Field of the Invention

The present invention generally relates to motion video compressing techniques and, more particularly, to a technique for predictive or interpolative motion compensation, a technique for detecting a motion vector which is used to the predictive or interpolative motion compensation, a technique for simplifying manipulations of the detection of the motion vector and a technique for selecting intra-frame transform coding or inter-frame predictive coding to optimize the compression.

2. Description of the Related Arts (1) Motion Video Compression Techniques

As techniques for compressing a moving picture signal into a bitstream, predictive/interpolative motion compensation, orthogonal transformation, quantization, variable length coding, etc. are used.

For example, predictive/interpolative motion compensation, discrete cosine transformation (DCT), adaptive quantization and Huffman coding have been adopted by the MPEG standard. Here, "MPEG" stands for "Moving Picture Experts Group," which is the name of a committee on the standardization of image compression established under the International Standards Organization (ISO), and the MPEG-1 standard is provided in the "ISO/IEC 11172," while the MPEG-2 standard is provided in the "ISO/IEC 13818."

As prior arts related to the above fields, there have been techniques disclosed in the U.S. Pat. No. 5,231,484 (the Japanese Unexamined Patent Publication No. 252507/1993), the U.S. Pat. No. 5,293,229 (the Japanese Unexamined Patent Publication No. 276502/1993) and the U.S. Pat. No. 5,325,125 (the Japanese Unexamined Patent Publication No. 225284/1994), for example.

In the above predictive or interpolative motion compensation, the region (=the reference macroblock) which bears the closest resemblance to the current macroblock in the current frame is searched for within the reference frame preceded in time and/or the reference frame following in time, and each difference value between the each pixel value in the searched reference macroblock and the corresponding pixel value in the current macroblock is obtained. Here, a vector which specifies the position of the reference macroblock from the position of the current macroblock is called a "motion vector," and an action of searching for the position of the reference macroblock is called the "detection of a motion vector." The macroblock is a region composed of 16×16 pixels and the predictive or interpolative motion compensation is performed in a macroblock. The block is a region composed of 8×8 pixels and the DCT is performed in a block. Thus the outputs of the motion estimation and compensation for a macroblock are motion vectors and a motion-compensated difference macroblock. And the each difference block in the difference macroblock is coded by using the DCT, the quantization and the variable length coding.

When the compressed difference macroblock is expanded, the image data of the corresponding reference macroblock (=specified by the motion vector of the difference macroblock) is added to the expanded difference macroblock data obtained by variable length decoding, inverse quantization and inverse DCT, whereby the image data of the current macroblock is reproduced. Here, the reference image data of at least one frame preceding in time and at least one frame following in time have been stored in a frame memory.

In the above DCT, each block partitioned into 8×8 pixels is transformed into frequency terms ranging from low frequency terms to high frequency terms and converted to a coefficient matrix $|Cij|$ composed of 8×8 coefficient(Cij)s. Hereinafter, suffixed "i" and "j" denote "i rows, j columns."

In the above quantization, each coefficient Cij of the 8×8 coefficient matrix $|Cij|$ is divided by a certain divisor Qij {(quantizer scale q)×(constant Kij proper to each coefficient Cij)} and the reminder is rounded off. Here, the constant Kij is given in a quantization matrix table. In the intra-macroblock, a quantization matrix table in which large values are provided to the coefficients of higher frequency terms and small values are provided to the coefficients of lower frequency terms is generally used, while in the inter-macroblock, all the constants Kij take the same value.

It is permitted by the MPEG standards to load the quantization matrix data Kij for intra-macroblock and inter-macroblock for each program or sequence. It is also provided for in the MPEG standards that the minimum requirement is to include at least one group of picture (GOP) in the sequence, and the quantization matrix data Kij can be changed in an IGOP as the minimum.

When the value of Kij and/or q increases, the coefficient data Cij outputted from a quantization circuit contains more "0" and the compression rate rises. In the above adaptive quantization, a bit-rate of a bitstream being outputted from the variable length coder is monitored, and the above quantizer scale q is set so that the value of the bit-rate being monitored can meet the target value. That is, when the bit-rate being monitored is smaller than the target value, the quantizer scale q is controlled to be smaller, and when the bit-rate being monitored is larger than the target value, the quantizer scale q is controlled to be larger. Incidentally, an example of a quantization circuit and a bit-rate controller are illustrated in FIG. 3 as a quantizer 118 and a bit-rate controller 124, respectively.

In the above Huffman coding, each code word is allocated according to the frequency of occurrence of each coefficient Cij(=Cij÷Qij(=Kij×q)) after quantization so that the code word can be shorter as the frequency of occurrence is higher.

(2) Detection of Motion Vector

As illustrated in FIG. 5, the motion vector is searched for from pixels within a region equivalent to a region of 8 pieces of 16×16 pixels centered around a region A0 (=a region of 16×16 pixels having the same coordinate position as that of the current macroblock which is a target of compression within a current frame) within a reference frame preceding in time and/or within a reference frame following in time. That is, within a region of 48×48 pixels centered around the region A0 is a target range of searching for the motion vector. When the motion vector is searched for beyond the above mentioned region, the large-scale circuit for the processing and the large-scale capacity for the memorizing is required.

As methods for detecting the motion vector of the current macroblock, in other words, as methods for searching for the region (=reference macroblock) bearing the closest resemblance to the current macroblock within the above mentioned searching region, the following are available.

*Full searching (FS) method

As illustrated in FIG. 5(a), the current macroblock is compared with the regions A1, A2, A3, . . . respectively within a specified searching range centered around the region A0 within the reference frame corresponding to the current macroblock, wherein the regions A2, A3, . . . have shifted from the preceding regions A1, A2, . . . , by one pixel starting from the upper left corner A1. This method requires the large-scale circuit for the processing and the large-scale capacity for the memorizing due to enormous number of regions to be compared but the precision of the motion vector detection is high.

*Logarithmic searching (LS) method

As illustrated in FIG. 5(b), comparison is made, for example, from the upper left→upper→upper right→left→center→right→under left→under→under right in this order within a specified searching range centered around the region A0 within the reference frame corresponding to the current macroblock. Incidentally, the order is an example, and the comparison may be done by another order. Then, the searching range is narrowed toward the region A3 which bears the closest resemblance to the current macroblock in the above 9 regions, and comparison is repeated in this way. As the narrowing of the searching range is logarithmic, this method is called "logarithmic searching method."

*Telescopic searching (TS) method

As illustrated in FIG. 5(c), from the region A1 indicated by the precedingly detected motion vector (=the motion vector detected with respect to the corresponding macroblock in the preceding frame, the motion vector detected with respect to the preceding macroblock, etc.), the regions in the vicinity of the region A1 are searched. As the regions to be compared are limited, the circuit scale for the processing and the capacity for the memorizing can be reduced but the precision of the motion vector detection is slightly lower than the FS method.

Furthermore, as the methods for detecting the region that bears the closest resemblance to the current macroblock among the above mentioned regions A0, A1, A2, . . . , the following methods are available.

*Sum of the absolute values (or square values)

Firstly, the differential values between the pixel values of the current macroblock and the corresponding pixel values of each of the regions A0, A1, A2, . . . are obtained, respectively. Then, the sum of the absolute values of each of the differential values or the sum of the square values of each of the differential values are calculated. And then, the region in which the sum is the smallest of all is detected as a reference macroblock.

*Number of coincident pixels

The number of pixels whose values are coincident between each of the regions A0, A1, A2, . . . to be compared and the current macroblock is calculated, and the region in which the number of such pixels is the largest is detected as a reference macroblock.

Incidentally, as prior arts related to the detection of the motion vector, there have been techniques disclosed in the Japanese Unexamined Patent Publications Nos. 199379/1982 (the U.S. Pat. No. 4,460,923), 107785/1983 (the U.S. Pat. No. 4,460,923), 101581/1983 (the U.S. Pat. No. 4,460,923), 145777/1992, 79484/1992, 40687/1991, 207790/1992, 234276/1992 and 40193/1992, and in the 78 p–85 p of ISO/IEC 11172-2, for example.

(3) Simplification of Circuit for Detecting Motion Vector

In the operation for detecting the motion vector, as each pixel value within each of a numerosity of regions of 16×16 pixels and each corresponding pixel value of the current macroblock is compared, respectively, the large-scale circuit for the processing and the large-scale capacity for the memorizing is required. For this reason, it has been desired that the the circuit scale for the processing and the capacity for the memorizing should be reduced without lowering the precision of the motion vector detection, and for this purpose, binary conversion has been proposed.

The binary conversion is a method in which each pixel value (8 bits value) of the current macroblock and each pixel value (8 bits value) of the above searching range are binary-coded respectively and then compared with each other to detect the motion vector. As the binary-coding methods, there have been techniques disclosed in the Japanese Unexamined Patent Publications Nos. 71580/1987, 874/1992 and 10176/1992, for example. The binary-coding technique disclosed in the Japanese Unexamined Patent Publication No. 71580/1987 will now be outlined referring to FIG. 1.

For simplifying the description, one frame is supposed to be 12×12 pixels and one macroblock is supposed to be 4×4 pixels. It is a matter of course that the following description can also be applied to the actual one frame and actual macroblock (16×16 pixels) in the same way.

A frame memory 10 stores the digital image signal of the current frame of 12×12 pixels, while a frame memory 12 stores the digital image signal of the preceding frame of 12×12 pixels. The digital image data of the current frame stored in the frame memory 10 is partitioned into macroblocks of 4×4 pixels each by a block converter 14.

Each macroblock outputted from the block converter 14 is binary-coded by a binary-coder 16. As a threshold for the binary-coding, the average value of the pixel values (8 bits each) of the macroblock is adopted. In this way, as illustrated in FIG. 1(b), the each pixel represented as 8-bits-data (=256 tones) in the macroblock (=4×4 pixels) is converted to the each pixel represented as 1-bit-data (=2 tones=black or white) in the binary-converted macroblock (=4×4 pixels). On the other hand, the binary-coder 16 outputs the above threshold to a binary-coder 18 for each macroblock as a reference value.

The binary-coder 18 converts the preceding frame outputted from the frame memory 12 into the binary-converted preceding frame by using the reference value outputted from the binary-coder 16 as a threshold. In this way, as illustrated in FIG. 1(c), the each pixel represented as 8-bits-data (=256 tones) in the preceding frame (=12×12 pixels) is converted to the each pixel represented as 1-bit-data (=2 tones=black or white) in the binary-converted preceding frame (=12×12 pixels). Incidentally, the preceding frame is binary-coded for each macroblock.

Binary-converted each pixel of the macroblock of the current frame and binary-converted corresponding pixel of the each region which is divided from the binary-converted preceding frame in specified order are compared with each other and the coincided pixels are detected through a motion vector detector 20. And then, in the motion vector detector 20, the number of coincided pixels are counted for each region, and the region which has the largest number of coincided pixels is detected as a reference macroblock.

SUMMERY OF THE INVENTION

A primary object of the present invention is to simplify the circuit configuration for detecting the motion vector and to reduce the capacity of the memory for storing the reference frames without lowering the precision of the motion vector detection.

Another object of the present invention is not to degrade the quality of the motion video to be compressed by using the motion vector even if the precision of the motion vector detection is degraded.

Another object of the present invention is to reduce the circuit configuration for compressing the motion video and to raise the quality of the motion video reproduced from the compressed data.

Still another object of the present invention is to provide the optimum techniques for compressing the motion video or for detecting the motion vector according to the characteristics of the motion video such as a scene with a little motions, a scene with a background in uniform motion and a scene with random and violent motions, respectively. In other words, this object is achieved to select an optimum technique for detecting the motion vector and for compressing the motion video by using the detected motion vector.

According to 1st to 4th embodiments of this invention, there are provided motion vector detector. The each detecter is comprised of frame memories, a circuit for dividing a current frame into macroblocks, a circuit for converting a gray-scale image of both the current macroblock and the reference frame to be rough, and a circuit for searching for a region (=a reference macroblock) bearing the closest resemblance to the current macroblock within the reference frame.

According to 5th to 10th embodiments of this invention, there are provided motion video encoder. The each encoder is comprised of a motion vector detector such as provided in the 1st to 4th embodiments, a circuit for inter-frame predictive coding by using motion vectors detected by the motion vector detector, a circuit for intra-frame transform coding a current macroblock, and a circuit for selecting an output of either the inter-frame predictive coder or the intra-frame transform coder to out put a compressed data so that the amount of the outputted data become less.

BRIEF DESCRIPTION OF THE DRAWINGS

In the accompanying drawings:

FIG. 4 is a descriptive view illustrating DCT and quantization;

FIG. 16 is a block diagram illustrating a circuit according to the tenth embodiment;

FIG. 17 is a descriptive view illustrating the detecting methods of characteristic diagram illustrated in FIGS. 18 through 22;

FIG. 18 is a characteristic diagram with respect to each detecting method illustrating the number of bits for the motion vector detection and SNR of the reproduced motion video of 4 Mbps in which a scene moves in the horizontal direction at a constant speed;

FIG. 19 is a characteristic diagram with respect to each detecting method illustrating the number of bits for the motion vector detection and SNR of the reproduced motion video of 9 Mbps in which a scene moves in the horizontal direction at a constant speed;

DETAILED DESCRIPTION OF THE PREFERRED EMBODIMENTS (1) MPEG Encoder

In the first place, an MPEG encoder will be described referring to FIGS. 2 through 4.

According to a method conformable to the MPEG standard, each frame of a motion video is divided into blocks of 8 pixels each in the horizontal direction and 8 pixels each in the vertical direction (8×8 pixels), and DCT, quantization and variable length coding are applied thereto for each block. Then, predictive/interpolative motion compensation is applied thereto for each macroblock composed of 4 blocks (16×16 pixels). As a B-picture illustrated in FIG. 2, in predictive coding with motion compensation, not only the frame preceding in time (past) but also the frame following in time (future) are adopted as reference frames. Here, an inter-frame and an intra-frame are adaptively selected.

Figure 2:
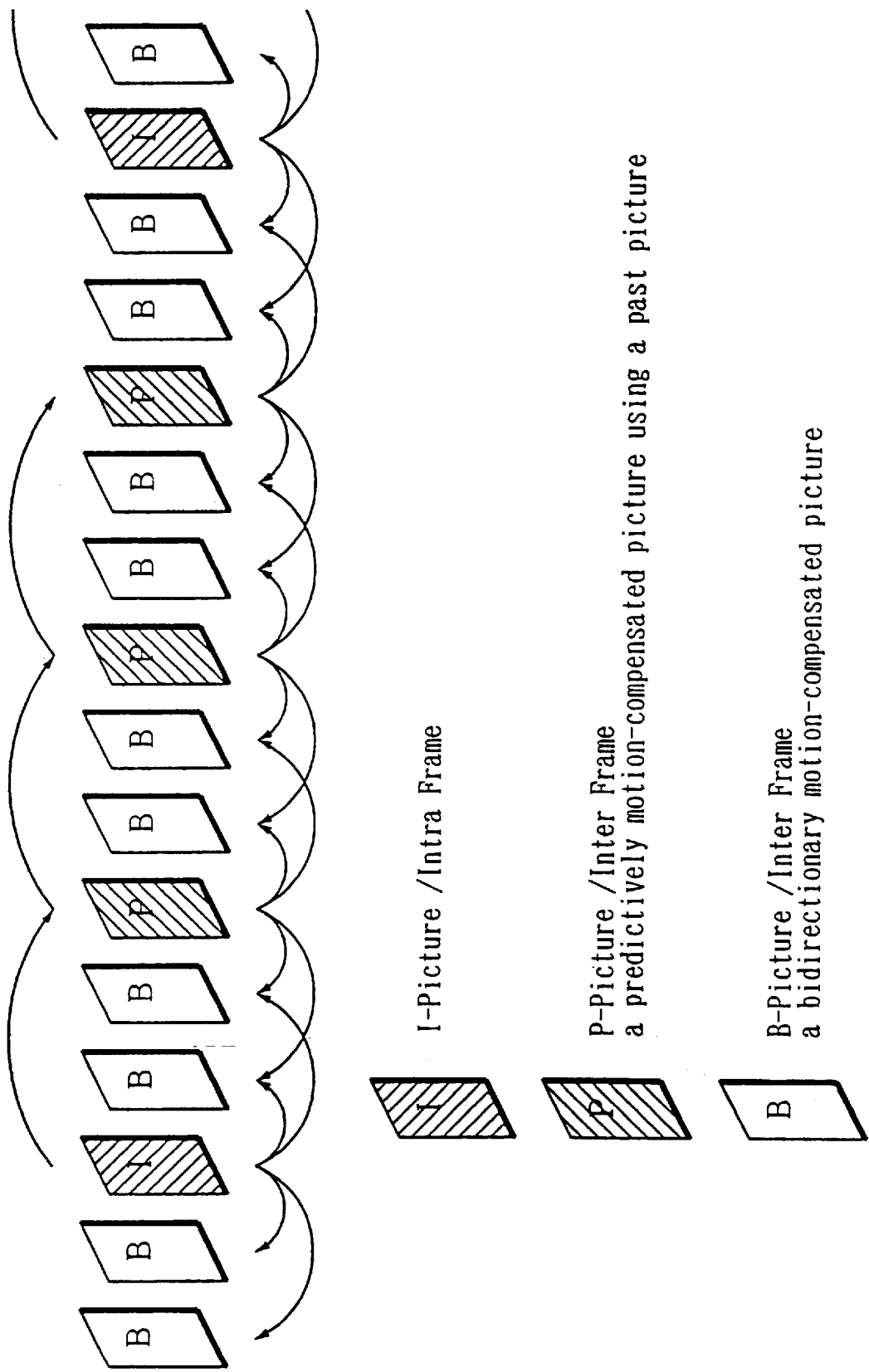
FIG. 2 is a descriptive view illustrating the predictive direction and arrangement of I-pictures, P-pictures and B-pictures of the MPEG type.
Figure 3:
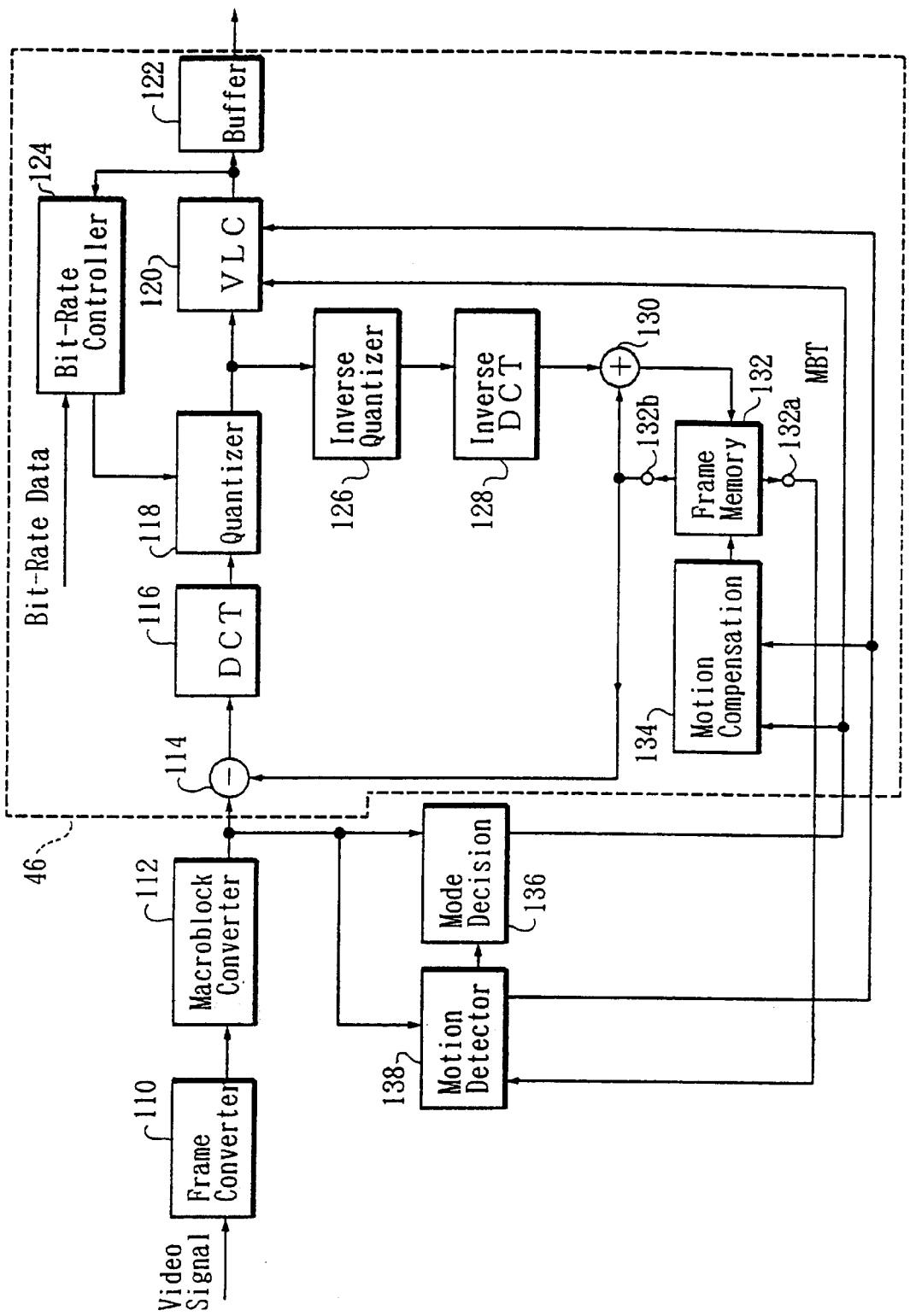
FIG. 3 is a block diagram illustrating an MPEG encoder according to an embodiment.
Figure 5A:
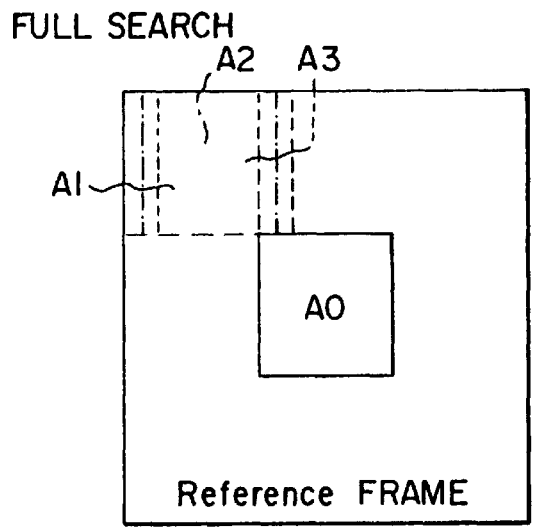
FIG. 5 is a descriptive view illustrating motion vector detecting techniques.
Figure 5B:
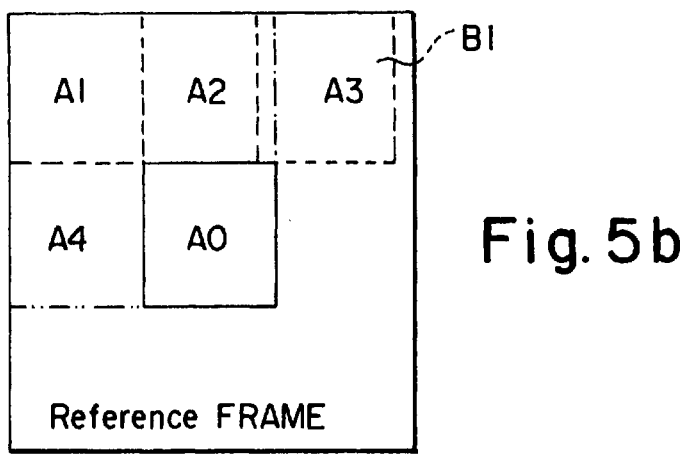
Figure 5C:
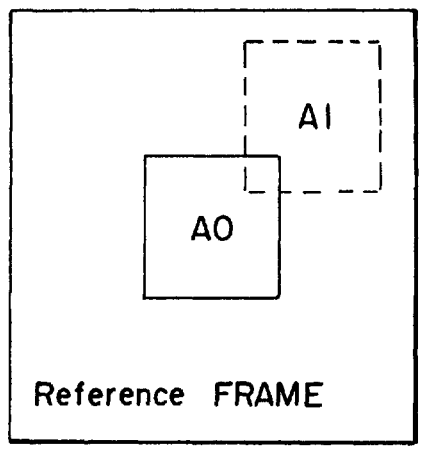

FIG. 2 illustrates the arrangement and predictive direction of the I-picture, P-picture and B-pictures of MPEG type, while FIG. 3 illustrates a block diagram of an MPEG encoder.

In a frame rearrange circuit 110, the frame order of the inputted motion video data is rearranged. Specifically, when the frame following in time is adopted as a reference frame, as the frame following in time should have been stored in a memory, the frame is rearranged so that the frame following in time can be processed first. The frame which is predictively coded by referring to the preceding frame is called a "P-picture," the frame which is predictively coded by referring to the preceding and/or following frame(s) is called a "B-picture," and the frame which is not predictively coded by referring to any reference frame is called an "I-picture."

It should be noted, however, that all the macroblocks of a B-picture are not predictively coded by referring to the preceding and/or following frame(s), but some macroblocks are not predictively coded due to little inter-frame correlativity. In the same way, all the macroblocks of a P-picture are not predictively coded by referring to the preceding frame, but some macroblocks are not predictively coded due to little inter-frame correlativity. The macroblock which is predictively coded by referring to the reference frame is called an "inter-macroblock," and the macroblock which is not predictively coded is called an "intra-macroblock." The type of macroblock is indicated by the macroblock type data (MBT).

In a block converter 112, the inputted signal is converted from raster scan format to a block format. In other words, each frame is divided into blocks of 8×8 pixels each so that the motion vector can be detected for each macroblock, and DCT, quantization, etc. can be applied thereto for each block.

In a subtractor 114, each pixel data of the reference block in the reference frame is subtracted from each pixel data of the current block in the current frame inputted from the block converter 112. On the other hand, the difference data of each pixel, which is the product of the operation, is sent to a DCT circuit 116 and subjected to DCT thereby. In the case of intra-macroblock, however, the data outputted from the block converter 112 is sent to the DCT circuit 116 as it is.

In the DCT circuit 116, DCT is applied to each block of 8×8 pixels for conversion to a coefficient matrix |Cij| with 8 rows and 8 columns as (a)→(b) illustrated in FIG. 4. Each coefficient Cij is quantized by a quantizer 118 as (b)→(c) illustrated in FIG. 4. To be specific, as (d) illustrated in FIG. 4, each coefficient Cij is divided by Qij (=Kij×q) and the reminder is rounded off, whereby the amount of data can substantially be reduced. The above quantizer scale q is given by a bit-rate controller 124.

After quantization, coefficient data C'ij outputted in order (from the coefficient of low frequency terms to the coefficient of high frequency terms) illustrated in (c) in FIG. 4 is subjected to the variable length coding through a variable length coder 120, and furthermore the amount of data is reduced. The data after being subjected to the variable length coding is stored in a buffer memory 122, and then read out at a specified bit-rate and outputted as a bitstream.

In the B-picture and the P-picture, as the difference value is subjected to DCT and then outputted, an amount of the data is smaller compared with the I-picture. For this reason, in the MPEG type, a target amount of the data is allocated according to the picture type, and the amount of the generated data is monitored for each slice and macroblock. The amount of the data is compared with the target value and evaluated. For example, when the amount of the generated data is larger than the target value, the quantizer scale q is enlarged and the quantization is coarsely performed. On the other hand, when the amount of the generated data is smaller than the target value, the quantizer scale q is become smaller and the quantization is finely performed. The buffer memory 122 buffers the variation in the amount of the generated data caused by the frame type, the frame characteristics and the quantizer scale.

In the NPEG encoder, the amount of the data stored in the buffer memory 122 is monitored and the amount of the data to be stored in a buffer memory on a MPEG decoder is simulated, and thereby the quantizer scale q is controlled so that the buffer memory of the MPEG decoder may not overflow. That is, the quantizer scale q is determined also in reference to the capacity of the buffer memory 122 and the variation in the capacity of the buffer memory 122. As the quantizer scale q, normally a value within a range from 1 to 31 is adopted.

Incidentally, it is not so general but the MPEG standard permits the variable transfer bit-rate in addition to the fixed transfer bit-rate. When the transfer bit-rate varies, it is quite natural that the quantizer scale q also varies.

A local decoder formed by an inverse quantizer 126 and an inverse DCT circuit 128 reproduces a reference image data for a preceding frame and/or for a following frame. The reproduced frame is stored in a frame memory 132 and then outputted to the subtractor 114 as described above. An adder 130 adds a motion compensated reference macroblock data in the reference frame to the data reproduced by the inverse quantizer 126 and the inverse DCT circuit 128 when the reproduced data is differential data.

A frame memory 132 stores the image data for at least 2 frames which are a pair of an I-picture and an I-picture, an I-picture and a P-picture, or a P-picture and a P-picture. A terminal 132b of the frame memory 132 outputs the image data for reference for each macroblock, while a terminal 132a of the frame memory 132 outputs the image data for motion vector detection to a motion detector 138. In the motion detector 138, the region (reference macroblock) which bears the closes resemblance to the current macroblock within the current frame is selected within the reference frame, the process of which will be described in detail later.

A motion compensator 134 directs the frame memory 132 to output image data describing a region (a reference macroblock) indicated by the motion vector data from the terminal 132b. As a result, the image data of the reference macroblock is sent to the subtractor 114, and as described above, the difference between the current macroblock and the reference macroblock is operated, and the differential data is sent to a DCT circuit 116. On the other hand, the image data of the reference macroblock is sent to the adder 130, and as described above, is added to the differential data of the current macroblock decoded through the inverse quantizer 126 and the inverse DCT circuit 128. Here, the processing in the motion compensator 134 is performed in reference to the MBT data sent from a mode selector 136. That is, determination whether the preceding frame should be outputted from the frame memory 132, the following frame should be outputted therefrom, or both the preceding frame and the following frame should be outputted or should not be outputted therefrom is made according to the MBT data.

The mode selector 136 detects the correlativity based on the difference between the current frame and the 2 frames within the frame memory 132, and outputs the MBT data which is the highest in compression rate. Specifically, the variance value of the current macroblock, the variance value of the difference between the current macroblock and the following frame macroblock, the variance value of the difference between the current macroblock and the preceding frame macroblock, and the variance value of the difference between the current macroblock and the preceding and following frame macroblocks are operated, and the type with the smallest variance value is determined as the macroblock type.

(2) Embodiment of Motion Vector Detector

Next, an embodiment of the motion vector detector which can search for the region which bears the closest resemblance to the current macroblock to be compressed within the preceding and/or following reference frame(s) will be described referring to FIGS. 7 through 10.

Figure 7:
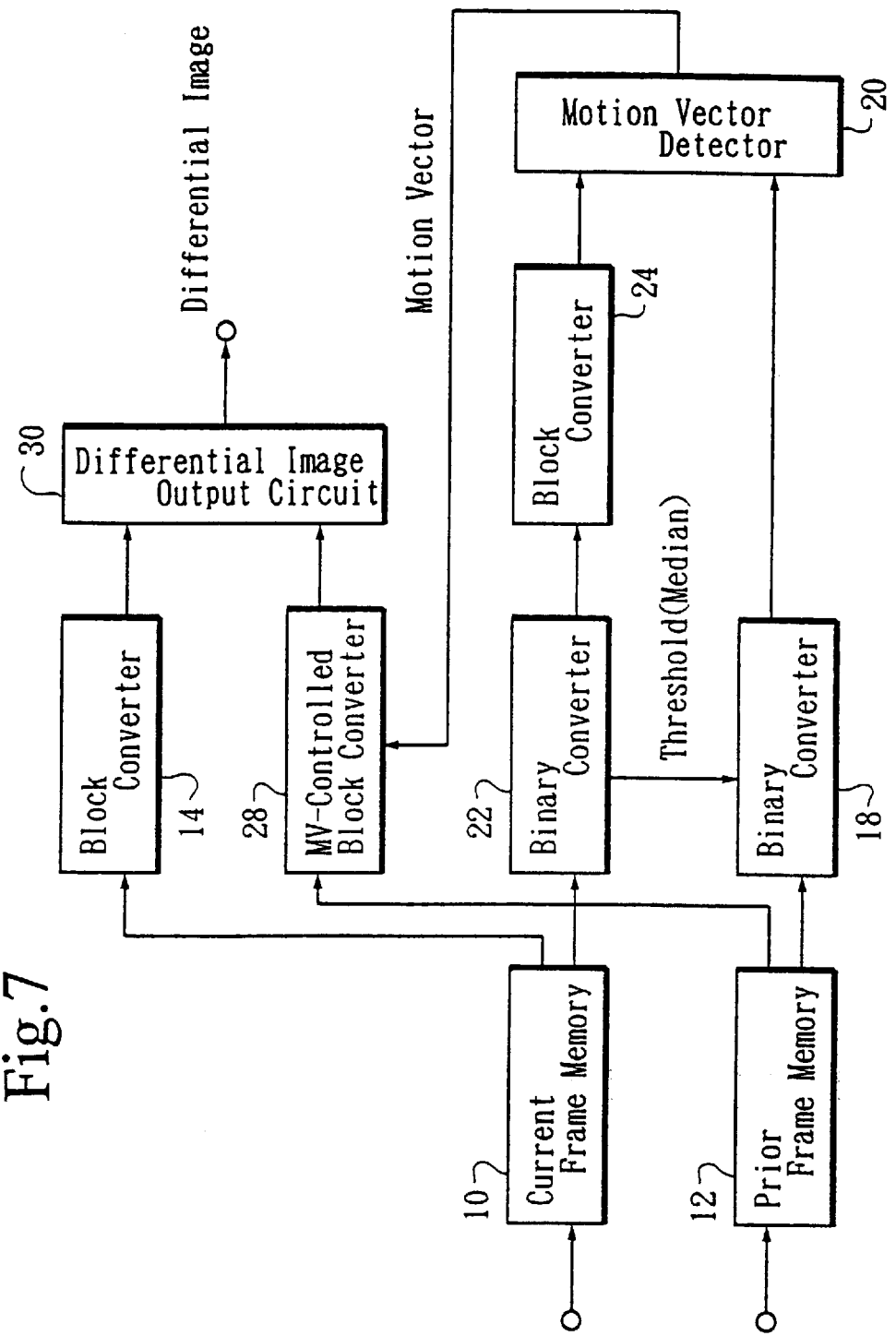
FIG. 7 is a block diagram illustrating a circuit according to the first embodiment.

(2-1) First Embodiment: FIG. 7

Figure 1:
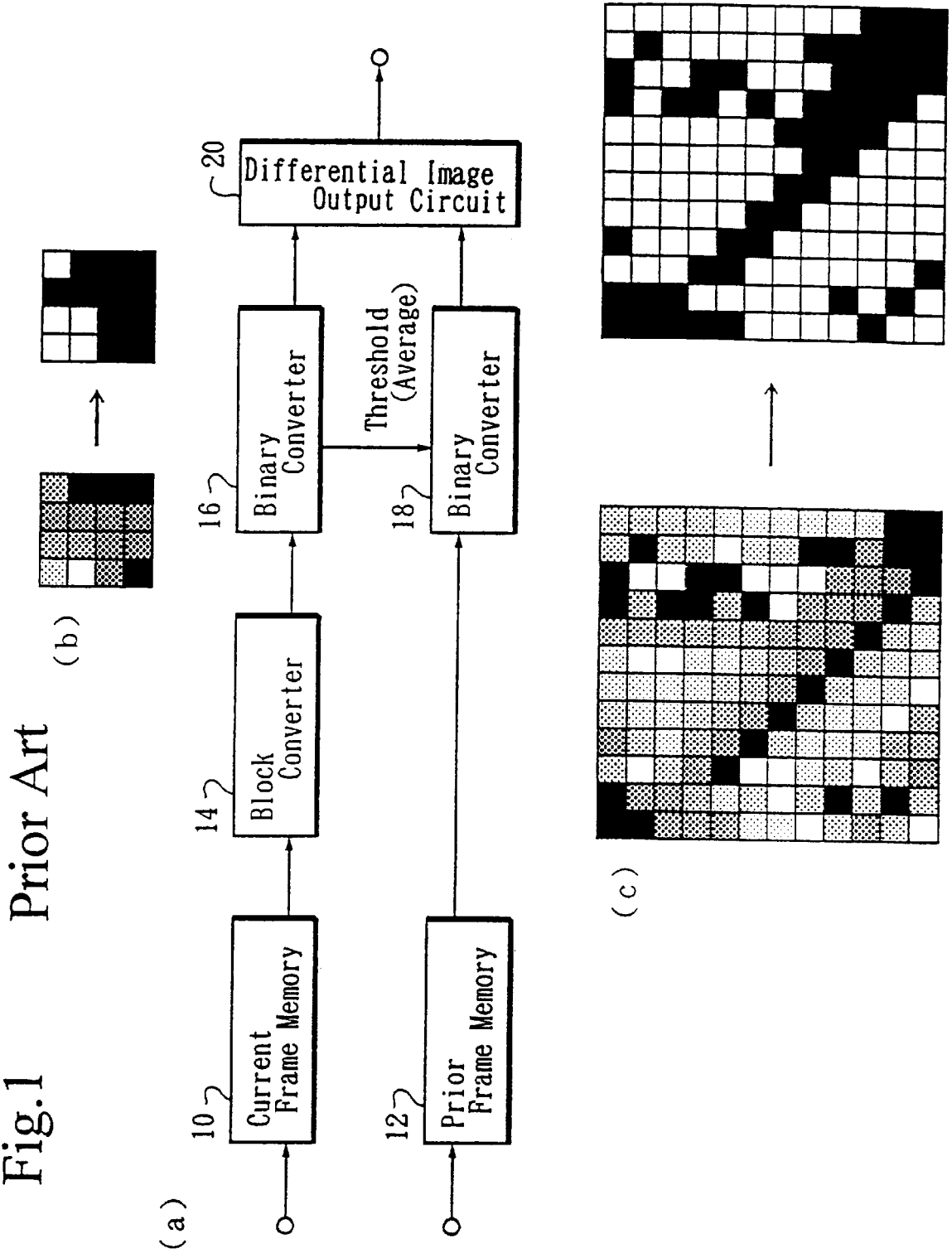
FIG. 1 is a descriptive view illustrating the configuration and functions of a conventional motion vector detector.

In FIG. 7, the same reference numerals will be allocated to the blocks which have the same functions as those illustrated in FIG. 1 and the description thereof will be omitted. It should be noted that in FIG. 1, one frame is described as 12×12 pixels and one macroblock is described as 4×4 pixels, and the same supposition will also be used in FIG. 7 for the convenience of description. In actuality, however, the number of pixels of one frame is far larger than 12×12 pixels and the number of pixels of one macroblock is 16×16 pixels.

A frame memory 10 stores the image data of the current frame. The number of bits of each pixel is 8 (256 tones). A frame memory 12 stores the image data of the preceding frame (or the following frame is also applicable). The number of bits of each pixel is 8 (256 tones) which is the same as that of the current frame.

A binary-coder 22 binary-codes each pixel of the current frame. The threshold of the binary-coding is the intermediate value of the pixel values of all the pixels within the current frame. Here, as one frame is 12×12 pixels, the intermediate value of the pixel values of 12×12=144 pixels, i.e., the pixel value which is the 77th or 78th largest within the current frame is set to be a threshold, and all the pixels within the current frame are binary-coded by using this pixel value as a threshold. That is, each pixel of 8 bits=256 tones is binary-coded to each 1 bit=2 tones (black and white) and sent to a block converter 24, while the above threshold is sent to a binary-coder 18.

In the binary-coder 18, all the pixels within the preceding frame (or the following frame is also applicable) which is the reference frame are binary-coded by using the above threshold sent from the binary-coder 22. All the binary-coded pixels (here, 12×12=144 pixels) are sent to a motion vector detector 20.

In the block converter 24, the inputted data is converted from raster scan format to a block format. That is, the binary-coded current frame (here, 12×12=144 pixels) is divided into blocks (here, 4×4=16 pixels each) and outputted to the motion vector detector 20 for each block.

In the motion vector detector 20, the region which bears the closest resemblance to the current macroblock sent from the block converter 24 is searched for, and this region is set to be a reference macroblock. Any of the above-described methods may be used for this searching process. When the reference macroblock is searched for, the data which specifies the coordinate position (second position) of the reference macroblock (second region) from the coordinate position (first position) within the reference frame (second frame) corresponding to the coordinate position of the current macroblock (first region) within the current frame (first frame) as motion vector data is sent to a motion vector controlled block circuit 28. Incidentally, the technique for detecting a motion vector based on binary-coded pixel data has been disclosed in the Japanese Unexamined Patent Publication No. 271580/1987 and therefore known to public.

In the motion vector controlled block circuit 28, the region (here, 4×4=16 pixels) of the coordinate position specified by the above motion vector is divided from a reference frame as a reference macroblock and sent to a differential image output circuit 30. Here, as the reference frame, a frame sent from the frame memory 12 is adopted, that is, the frame of 256 tones (=8 bits for each pixel) which has not yet binary-coded is adopted.

In the differential image output circuit 30, the difference between the reference macroblock and the current macroblock divided from within the current frame by the block converter 14 is operated. Here, as the current frame, the frame sent from the frame memory 10 is adopted, that is, the frame of 256 tones (=8 bits) which has not yet binary-coded is adopted.

In the first embodiment, as the binary-coding is performed before block converting, there is no need to perform the binary-coding in the binary-coder 18 for each current macroblock. This means that only one binary-coding is sufficient for each frame.

Also in the first embodiment, the intermediate value of the pixel values of the current frame is adopted as a threshold for the binary-coding. As this intermediate value can be obtained only by the comparison of the pixel value of each pixel, the process can be simplified. That is, there is no need to operate the mean value. Incidentally, this effect can also be enjoyed even when the binary-coder 22 is provided behind the block converter 24. In this case, if the binary-coding of the reference frame is arranged to be performed within the searching range of the motion vector, the circuit configuration of the binary-coder 18 can be simplified.

Figure 8:
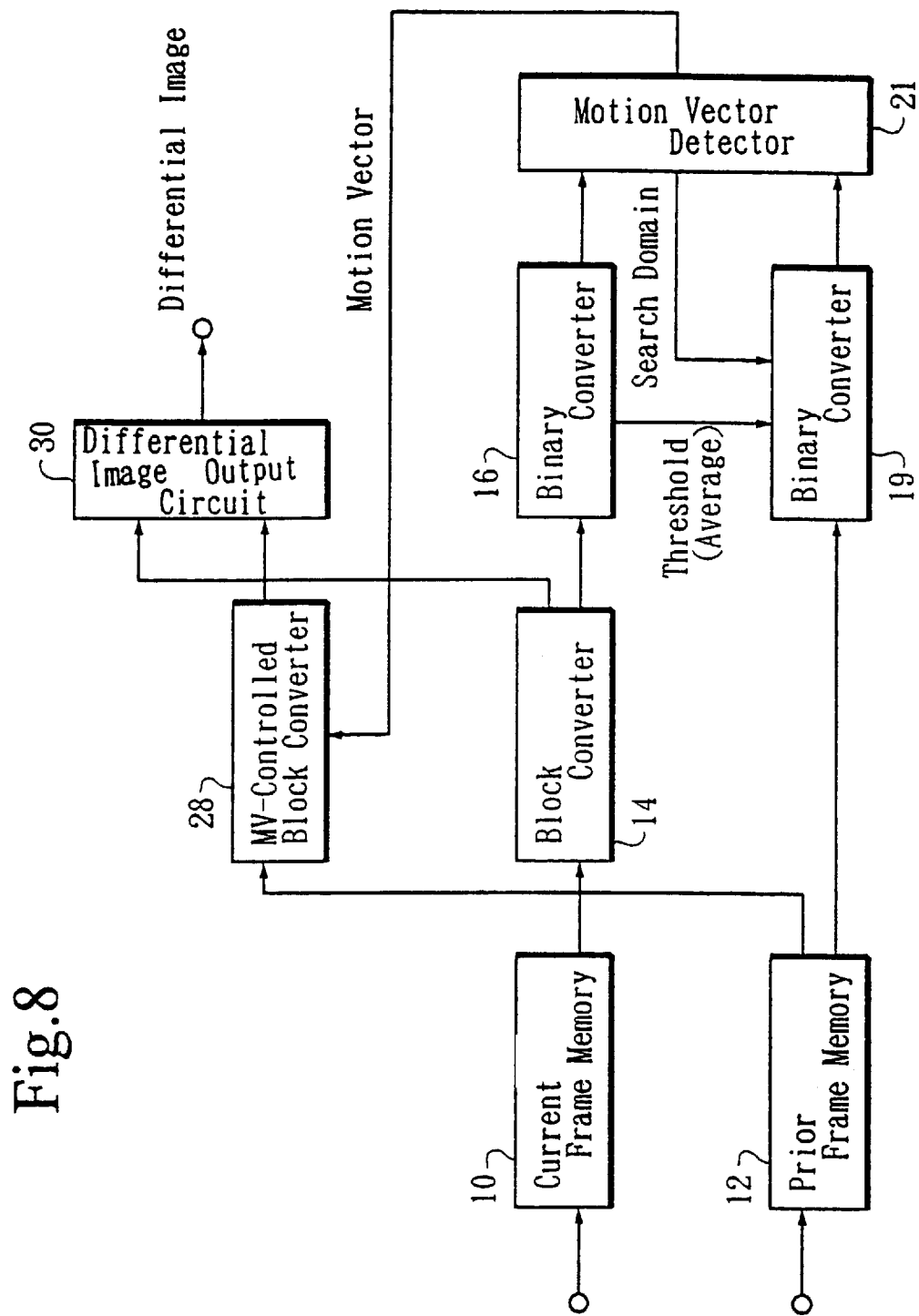
FIG. 8 is a block diagram illustrating a circuit according to the second embodiment.

(2-2) Second Embodiment: FIG. 8

The second embodiment is the configuration as referred to in the last part of the description of the first embodiment. Specifically, a binary-coder 22 is provided behind a block converter 24 (a block converter 14 is used for this purpose in FIG. 8) and the binary-coding of the reference frame is performed within the search range of the motion vector. In the following paragraphs, only those parts which differ from FIG. 7 will be described, and the common parts will be allocated with the same reference numerals and the description thereof will be omitted.

A motion vector detector 21 outputs the search-range data indicating the searching area of the motion vector to a binary-coder 19. The binary-coder 19 binary-codes each pixel within the region specified within the reference frame based on the search-range data. As the threshold of this binary-coding, the mean (avarage) value sent from a binary-coder 16 is adopted.

In the binary-coder 16, the mean (avarage) value of the pixel values of the pixels within the current macroblock divided from the current frame through a block converter 14 is obtained and the current macroblock using the mean (avarage) value as a threshold is binary-coded. This mean (avarage) value is sent to a binary-coder 19 and used for the binary-coding in the binary-coder 19.

It should be noted that in the second embodiment, the above mean (avarage) value is operated whenever the current macroblock is divided from the block converter 14, each pixel within the motion vector searching range of the reference frame is binary-coded in correspondence with each current macroblock.

In this second embodiment, the motion vector searching range is adopted as a binary-coding range within the reference frame. There is no need, however, to exactly coincide this binary-coding range with the motion vector searching range, and it is sufficient if the motion vector searching range is contained within the binary-coding range within the reference frame.

Figure 9:
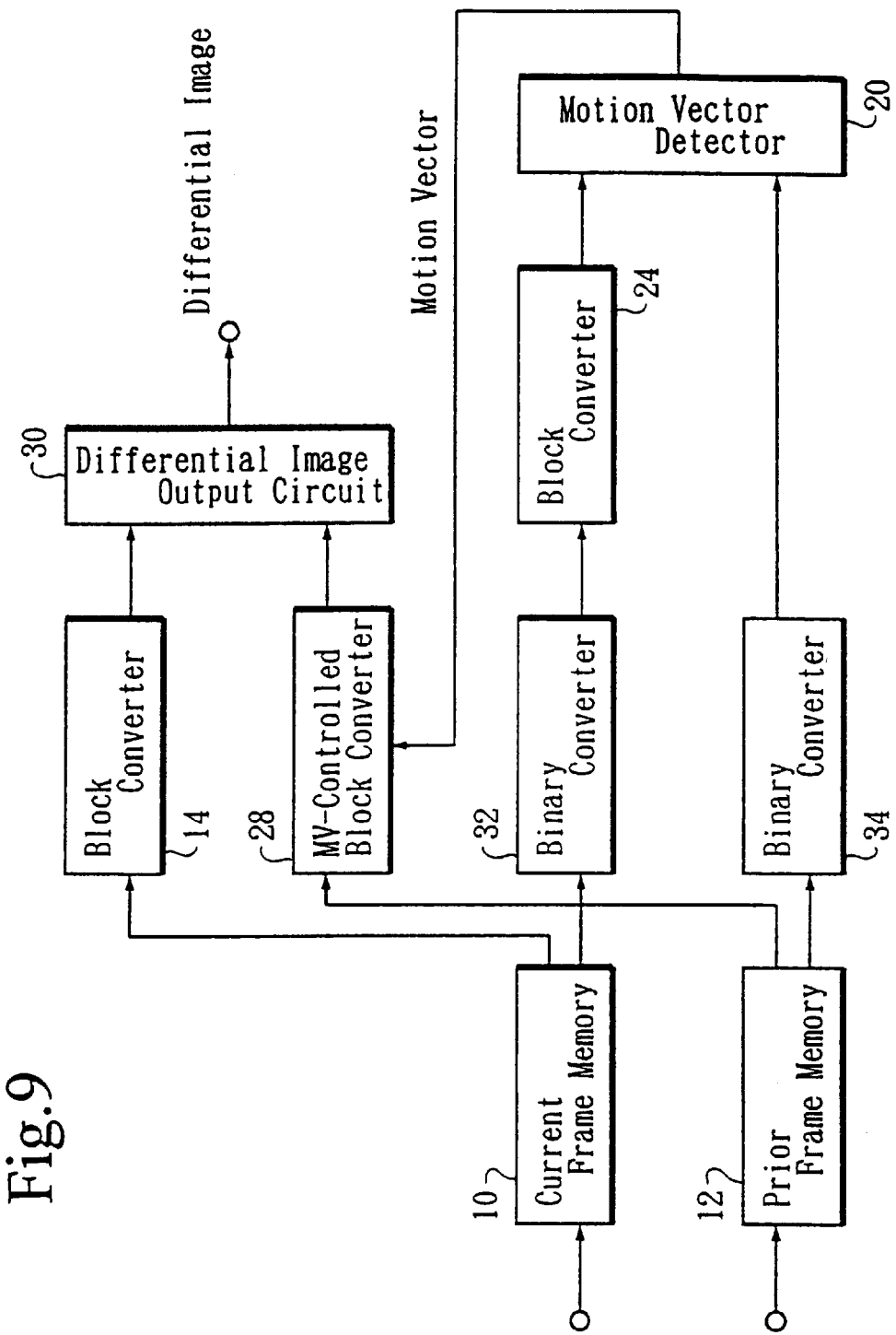
FIG. 9 is a block diagram illustrating a circuit according to the third embodiment.

(2-3) Third Embodiment: FIG. 9

The third embodiment is so composed that a binary-coder 32 is provided instead of the binary-coder 22 of the first embodiment and a binary-coder 34 is provided instead of the binary-coder 18 of the first embodiment. The other parts of the composition remain the same as those of the first embodiment and therefore the description thereof will be omitted.

In the binary-coder 32, each pixel within the current frame is binary-coded according to the value comparison with each pixel next on the right.

For example, first of all, the pixel value of the first pixel within the current frame is set to "1=black."

Then, the pixel value of the next pixel (=current pixel) is compared with the pixel value of the immediately preceding pixel.

As a result, if (the pixel value of the next pixel)≦(the pixel value of the immediately preceding pixel), the pixel value of the current pixel is set to "1=black."

Inversely, if (the pixel value of the next pixel)>(the pixel value of the immediately preceding pixel), the pixel value of the current pixel is set to "0=white." In this case, the first pixel of the second line is compared with the last pixel of the first line.

In the binary-coder 34, each pixel within the reference frame is binary-coded in the same way as the above binary-coder 32. That is, in the third embodiment, unlike the second embodiment, the threshold based on the current frame is not adopted for the binary-coding of the reference frame, but the same logic is applied as a binary-coding logic to the current frame and the reference frame.

As described above, in the third embodiment, as each pixel is binary-coded according to the value-comparison with the next pixel, there is no need to operate the mean (average) value, and therefore the circuit configuration of both the binary-coder 32 and the binary-coder 34 can be simplified.

Figure 10:
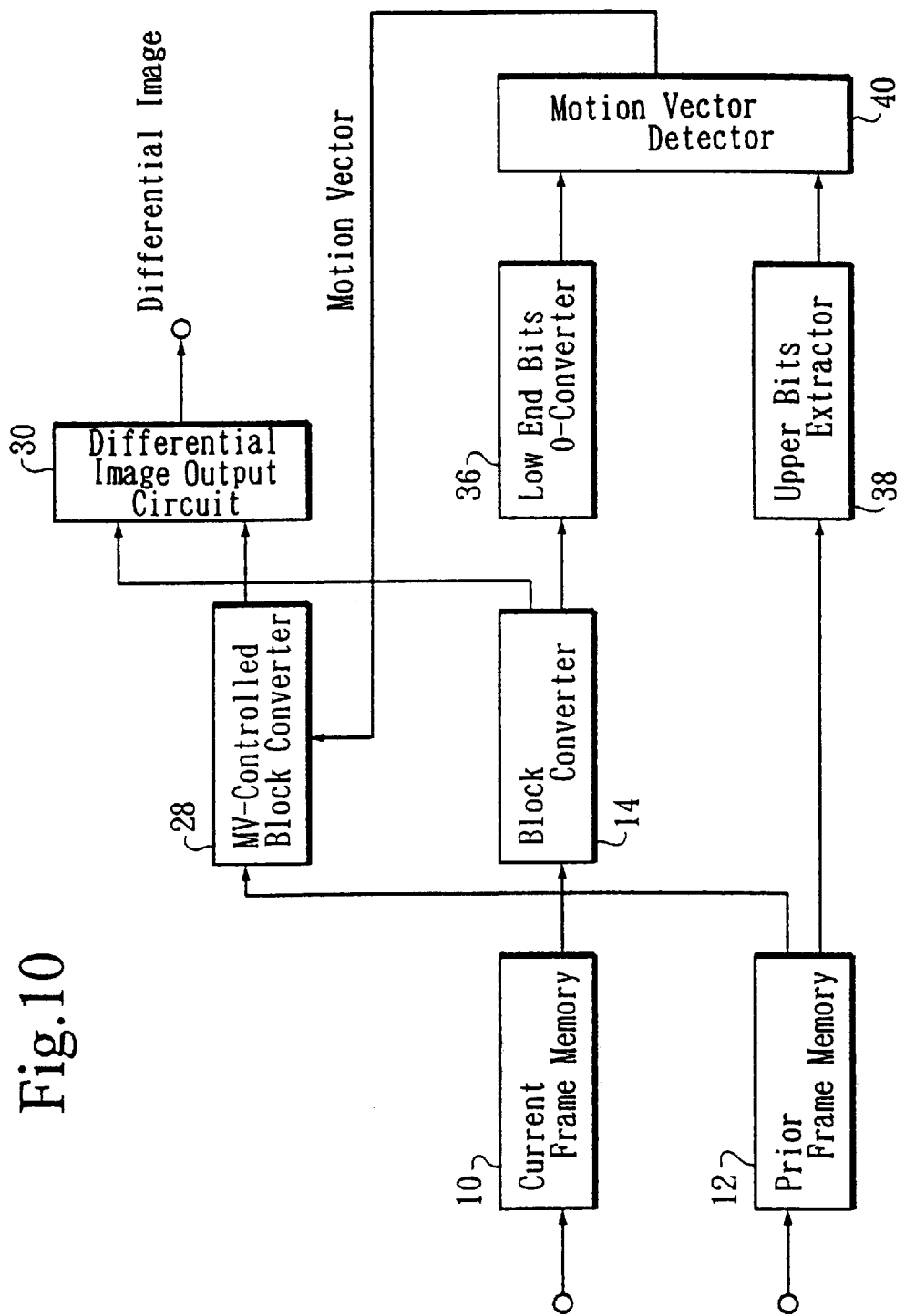
FIG. 10 is a block diagram illustrating a circuit according to the fourth embodiment.

(2-4) Fourth Embodiment: FIG. 10

The fourth embodiment is so composed that a upper bits extracting circuit 36 is provided instead of the binary-coder 16 of the second embodiment and a upper bits extracting circuit 38 is provided instead of the binary-coder 19 of the second embodiment. The other parts of the composition remain the same as those of the second embodiment, and therefore the description thereof will be omitted.

In the upper bits extracting circuit 36, only the upper 5 bits of each pixel (8 bits=256 tones) of the current macroblock are extracted, in other words, each pixel is set to be a pixel data of the upper 5 bits (=32 tones) and sent to a motion vector detector 20.

In the upper bits extracting circuit 38, only the upper 5 bits of each pixel (8 bits=256 tones) within the reference frame are extracted, in other words, each pixel is set to be a pixel data of the upper 5 bits (=32 tones) and sent to a motion vector detector 40.

In the motion vector detector 40, the area which bears the closest resemblance to the current macroblock is searched for within the reference frame based on the comparison with the current macroblock of 32 tones (=5 bits data for each pixel) and the reference frame of 32 tones (=5 bits data for each pixel) by using the any method (e.g., the "Sum of the absolute values (or square values)", the "Number of coincident pixels"). On the other hand, the motion vector data indicating the reference macroblock is sent to a motion vector controlled block converter 28. Incidentally, the technique for detecting a motion vector based on upper-bits-extracted pixel data has been disclosed in the U.S. Pat. No. 5,253,052 (the Japanese Unexamined Patent Publications Nos. 22199/1994, 323781/1992). In the Japanese Unexamined Patent Publications No. 323781/1992, the input motion video data (8-bits for each pixel) is converted to the data (10-bits for each pixel) through a high pass filter, then upper 8-bits are extracted therefrom.

As described above, in the fourth embodiment, as the upper bits of each pixel data are extracted to be served for motion vector detection, the circuit configuration of the motion vector detector 40 can be simplified without lowering the precision of motion vector detection so much. It is a matter of course that if the number of the upper bits to be extracted is decreased, the circuit configuration of the motion vector detector 40 can further be simplified, but the precision of motion vector detection is also degraded.

Also in the motion vector detector 40, when the reference macroblock is detected by using the "Number of coincident pixels," the circuit configuration of the motion vector detector 40 can further be simplified. In this case, however, if the number of bits to be extracted by the upper bits extracting circuit 36 and 38 is decreased, the precision of motion vector detection can be improved. If the number of bits to be extracted by the upper bits extracting circuit 36 and 38 is excessively decreased, the precision of motion vector detection is degraded.

In the MPEG type in which one macroblock is composed of 16×16 pixels, if the lower 6 to 4 bits of each pixel data are ignored and the upper 2 to 4 bits are extracted, the circuit configuration of the motion vector detector 40 can further be simplified and the degradation in the picture quality can be reduced. In short, the simplification of the circuit configuration and the prevention of the picture quality degradation can concurrently be optimized.

In each of the above mentioned embodiments, the processing as to the current frame and the preceding frame (or the following frame) has been described. This description can also be applied to the processing as to a pair of the current frame and frame before the preceding frame and a pair of the current frame and frame after the following frame. In this case, however, the searching range of the motion vector is changed according to the frame distance.

Furthermore, in each of the above embodiments, the present invention is described based on the functional block diagrams. Of course, the description of the present invention based on software is also possible.

Moreover, in each of the above embodiment, although the motion vector itself is detected, the present invention may also be applied to either step of the two-step searching in which the motion vector is coarsely detected and then finely detected.

(3) Embodiment of Motion Video Compression circuit

An embodiment of a motion video compression circuit which performs predictive coding by using any of the above motion vector detectors will now be described referring to FIGS. 11 through 16. Furthermore, the compression efficiency and picture quality of each compression circuit will be evaluated referring to FIGS. 17 through 22.

Figure 11:
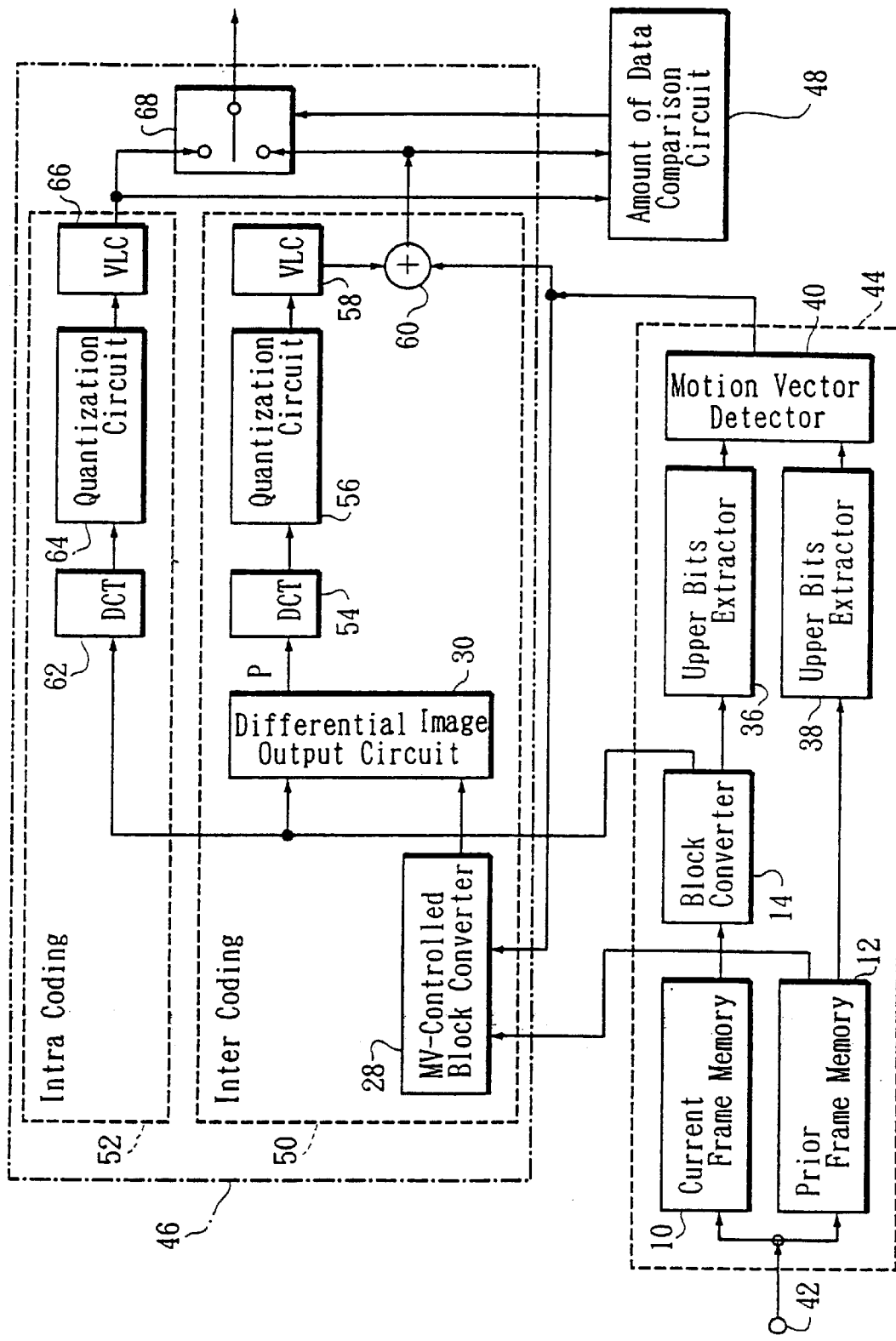
FIG. 11 is a block diagram illustrating a circuit according to the fifth embodiment.

(3-1) Fifth Embodiment: FIG. 11

A motion video data of 256 tones (=8 bits for each pixel) is inputted from an input terminal 42, and the motion vector is detected from the motion video data through a predictive data detector 44. A composition of the predictive data detector 44 added with a motion-vector-controlled block converter 28 and a difference image output circuit 30 is equivalent to the above fourth embodiment (FIG. 10). Therefore, the description of these configurations will be omitted.

In the above fourth embodiment (FIG. 10), one frame is described as 12×12 pixels and one macroblock is described as 4×4 pixels. In the fifth embodiment, however, the number of pixels of one frame is far large, and one macroblock is composed of 16×16 pixels. As the number of pixels composing one macroblock is larger than that of the above fourth embodiment (FIG. 10), the upper 5 bits are extracted through the upper bits extracting circuit 36 and 38 (FIG. 10)

respectively and the lower 3 bits are discarded. In the fifth embodiment, however, this composition is changed to a composition that the upper 4 bits are extracted through the upper bits extracting circuit 36 and 38 (FIG. 11) respectively and the lower 4 bits are discarded.

In an adaptive coding circuit 46, inter-frame predictive coding with motion compensation (coding by an inter-frame coder 50) and intra-frame transform coding (coding by an intra-frame coder 52) are adaptively selected to be performed. This selection is controlled by a bit-rate comparator 48, that is, the bit-rate of the data outputted from the inter-frame coder 50 and the bit-rate of the data outputted from the intra-frame coder 52 are compared with each other by the bit-rate comparator 48, and a selector switch 68 is switched so that the output of the coder with small bit-rate can be selected. Incidentally, the technique for selecting a coding with a higher compression efficiency has been disclosed in the U.S. Pat. No. 4,698,672 (the Japanese Unexamined Patent Publication No. 148789/1988) and therefore known to public.

In the inter-frame coder 50, the differential data P describing the difference between the reference macroblock data and the current macroblock data is outputted from the differential image output circuit 30, then the differential data P is firstly transformed by a DCT circuit 54, then quantized by a quantizer 56, and then variable length coded by a variable length coder 58. The output from the variable length coder 58 and the motion vector data from the motion vector detector 40 are combined by a multiplexer 60, and the combined data is sent to one of the terminals of the selector switch 68.

In the intra-frame coder 52, the current macroblock data outputted from the block converter 14 is firstly transformed by a DCT circuit 62, then quantized by a quantizer 64 and, and then variable length coded by a variable length coder 66. And the output from the variable length coder 66 is sent to the other terminal of the selector switch 68.

In the selector switch 68, either of the data outputted from the inter-frame coder 50 and the data outputted from the intra-frame coder 52, both of which being inputted thereto as described above, is selected in accordance with the command from the bit-rate comparator 48 and outputted to the outside.

Figure 6A:
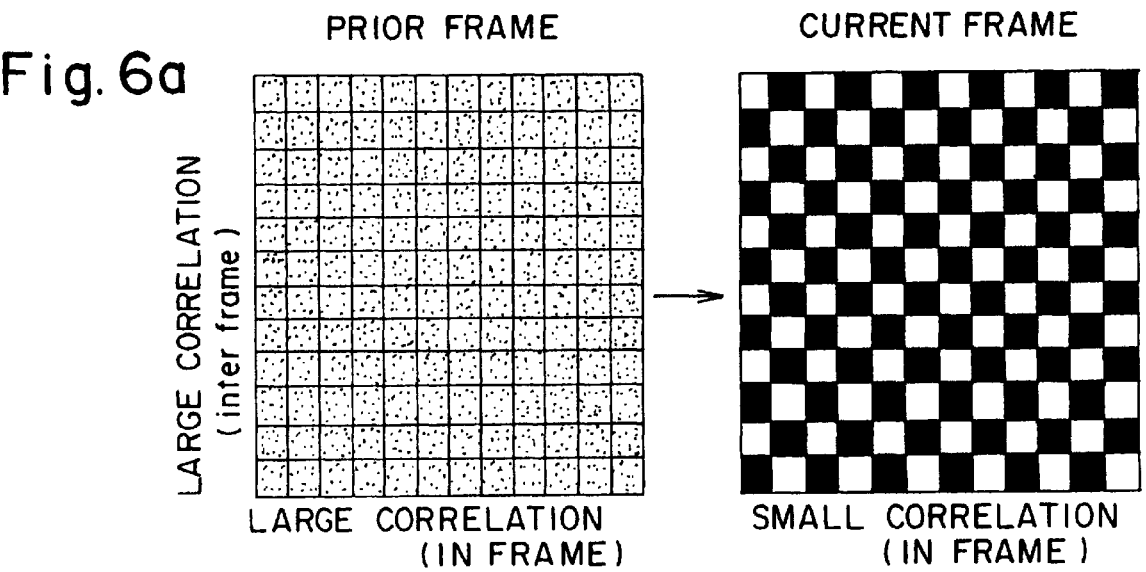
FIG. 6 is a descriptive view illustrating the correlation between a preceding frame and a current frame, and the correlation in a frame.
Figure 6B:
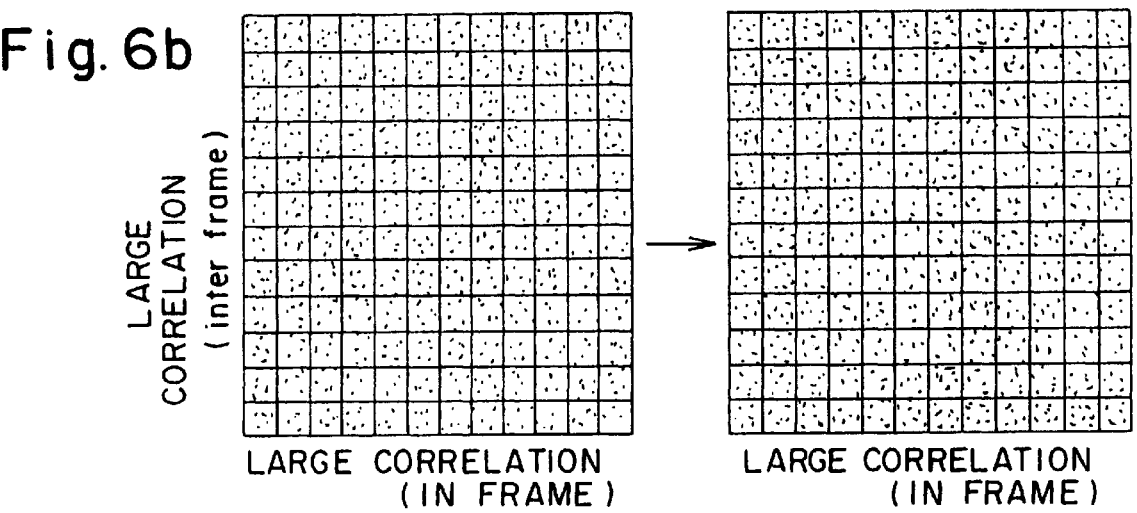
Figure 6C:
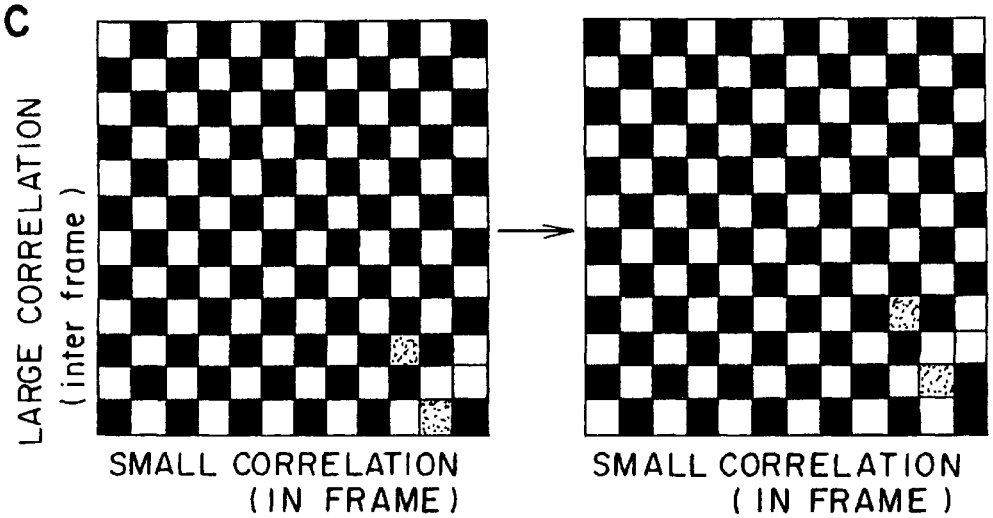

Here, the relation between the compression efficiency of the inter-coding and the intra-coding will be described referring to FIG. 6. And then, the method for selecting one of the intra-frame coding or the inter-frame coding in order to raise the compression efficiency will be explained.

When the correlation between the preceding frame and the current frame is small, the intra-frame transform coding has higher compression rate, and therefore the intra-frame transform coding is selected. In the case of (a), however, the precision of the motion vector detected by the predictive data detector 44 is lower.

When the correlation between the preceding frame and the current frame is large and the correlation in the current frame is also large as illustrated in (b), it is difficult to detect the motion vector with high precision based on the images of the upper 4 bits-data inputted into the motion vector detector 40. However, as such current image has a large intra-frame correlation, data with sufficiently high compression rate can be obtained by means of intra-frame transform coding. Therefore, even if the bit-rate comparator 48 selects any output, the degradation in the compression rate is small.

When the correlation between the preceding frame and the current frame is large but the correlation in the current frame is small as illustrated in (c), the motion vector with sufficiently high precision can be detected based on the images of the upper 4 bits-data inputted into the motion vector detector 40. Therefore, when the bit-rate comparator 48 selects the output from the inter-frame coder 50, data with sufficiently high compression rate can be obtained, that is, the degradation in the compression rate is small.

As described above, in the fifth embodiment, as the detection of the motion vector is performed by comparing the images with only the upper bits-data extracted, the precision of the motion vector is slightly degraded. However, as this degradation is compensated by adaptively switching the inter-frame predictive transform coding and the intra-frame transform coding, the compression rate is high as a whole, and an image with less circuit component and higher picture quality can be obtained, that is, both the compression rate and the picture quality are optimized.

Figure 12:
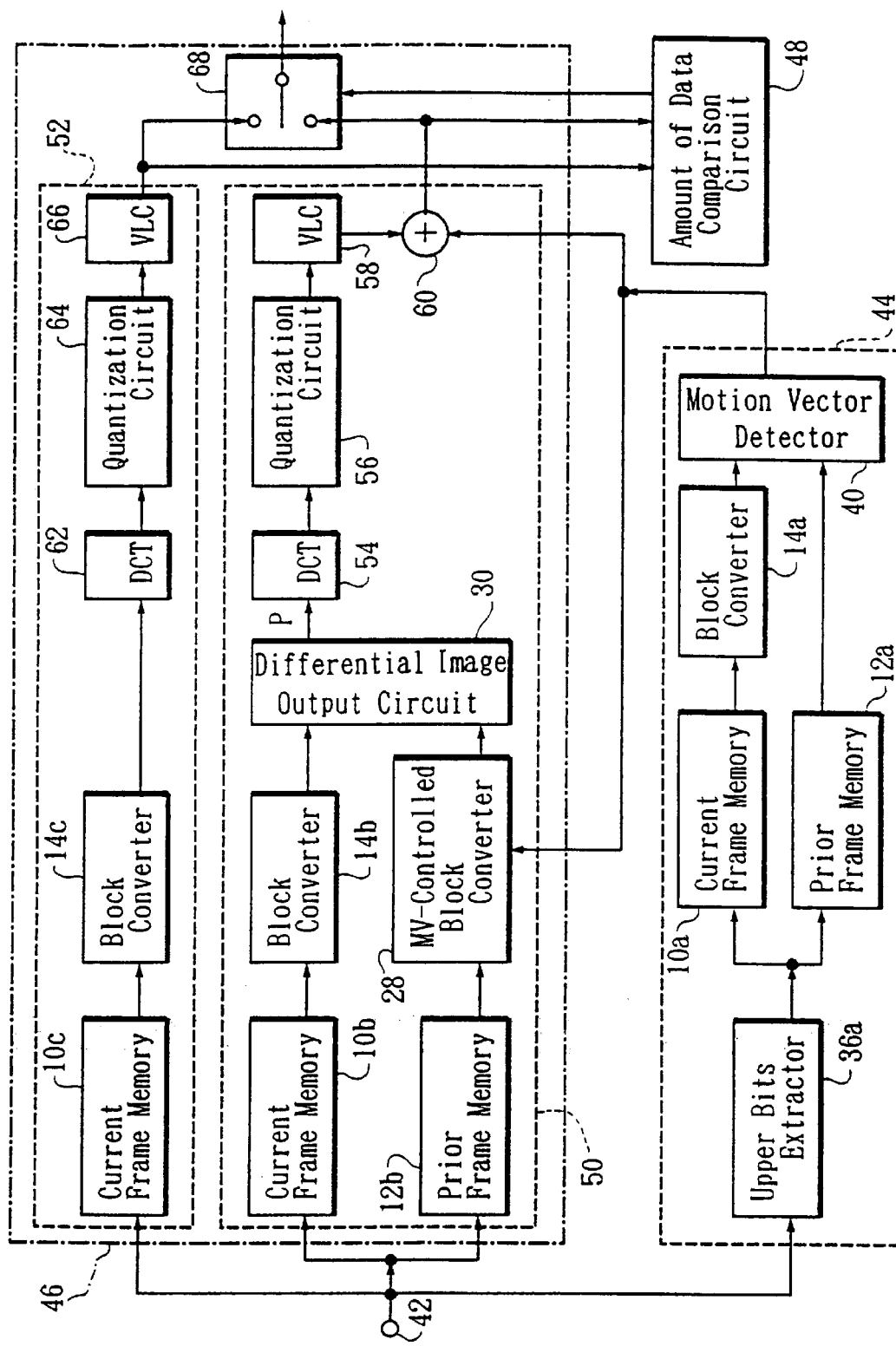
FIG. 12 is a block diagram illustrating a circuit according to the sixth embodiment.

(3-2) Sixth Embodiment: FIG. 12

The sixth embodiment is the same as the fifth embodiment in composition excepting that frame memory is provided to the predictive data detector 44, inter-frame coder 50 and intra-frame coder 52 of the fifth embodiment. That is, a predictive data detector 44 is provided with a frame memory 10a for the current frame and a frame memory 12a for the preceding frame, an inter-frame coder 50 is provided with a frame memory 10b for the current frame and a frame memory 12b for the preceding frame, and an intra-frame coder 52 is provided with a frame memory 10c for the current frame. As the other parts of the composition are the same as those of the above fifth embodiment, the same reference numerals will be allocated to the coincided parts respectively and the description thereof will be omitted.

As the each circuit is provided with a frame memory as described above, it is possible that the each circuit can be made independent. For example, in the predictive data detector 44, a upper bits extracting circuit 36a can be disposed at the inlet thereof, the overall circuit configuration can be simplified.

Figure 13:
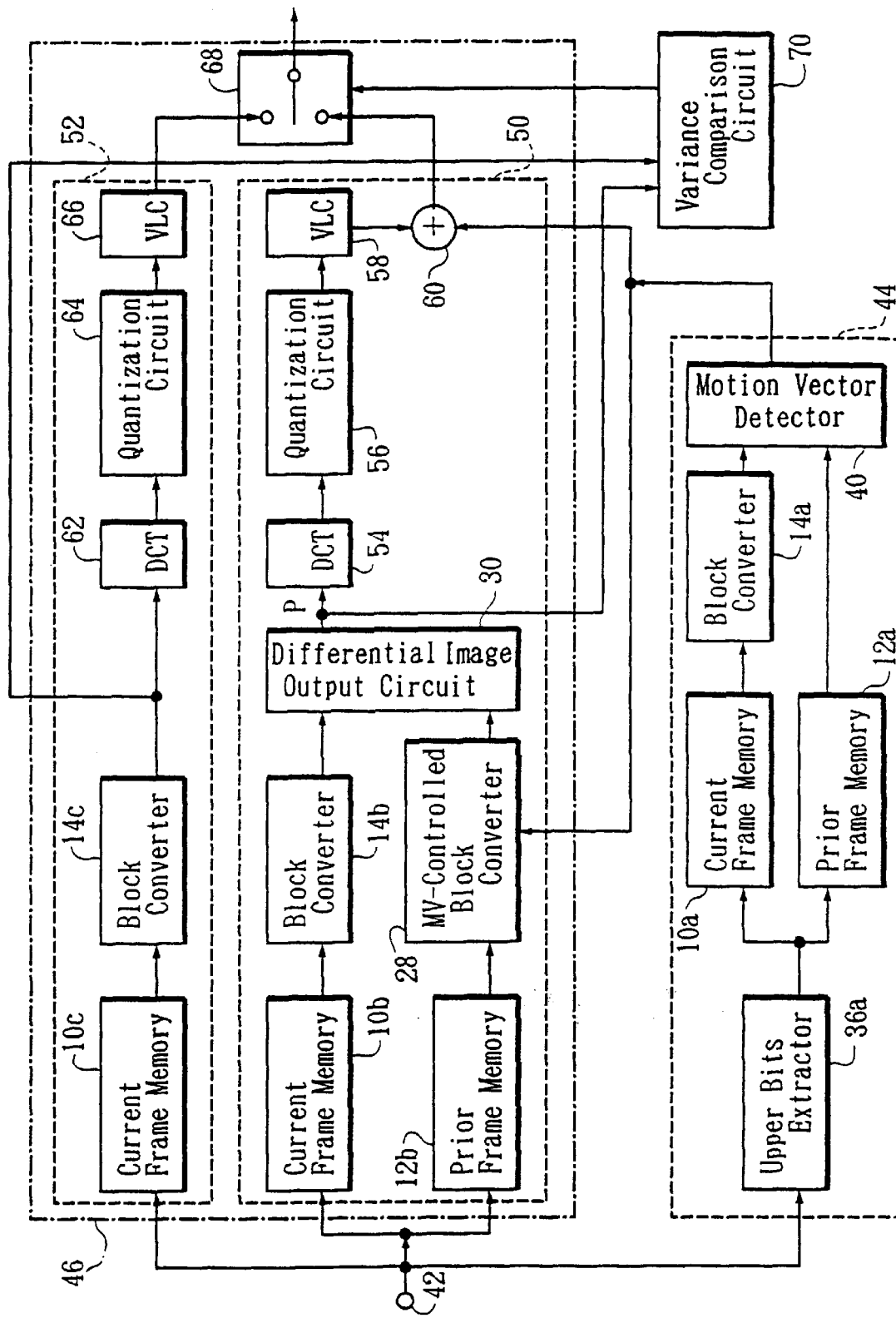
FIG. 13 is a block diagram illustrating a circuit according to the seventh embodiment.

(3-3) Seventh Embodiment: FIG. 13

In the seventh embodiment, instead of the bit-rate comparator 48 of the above sixth embodiment, a variance comparator 70 is provided. As the other parts of the configuration are the same as those of the sixth embodiment, the same reference numerals will be allocated to the coincided parts respectively and the description thereof will be omitted.

In the variance comparator 70, the variance value and mean value of the differential data P outputted from a differential image output circuit 30 of an inter-frame coder 50 and the variance value and mean value of the current image data outputted from a block converter 14c of an intra-frame coder 52 are obtained and compared with each other. As a result of this comparison, the output of the circuit which has smaller variance value is selected by the switch 68. The technique for selecting a coding with a higher compression efficiency based on the variance value has been disclosed in the Japanese Unexamined Patent Publications Nos. 133301/1994 and 137129/1993 and therefore known to public.

Figure 14:
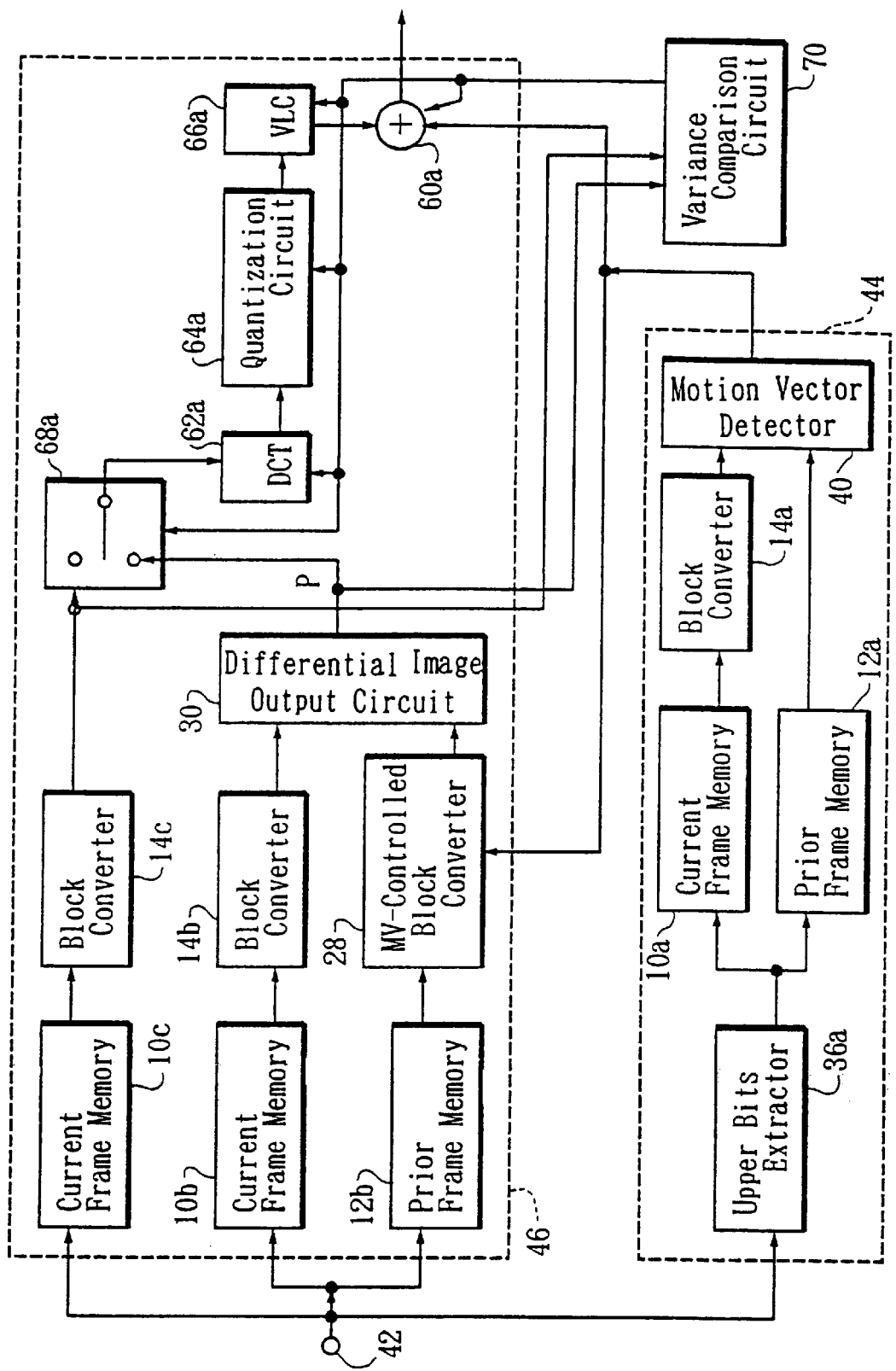
FIG. 14 is a block diagram illustrating a circuit according to the eighth embodiment.

(3-4) Eighth Embodiment: FIG. 14

In the eighth embodiment, it is so composed that the respective circuits for DCT, quantization and variable length coding according to the above seventh embodiment are shared by an inter-frame coder 50 and an intra-frame coder 52. As the other parts of the composition are the same as those of the seventh embodiment, the same reference numerals will be allocated to the coincided parts respectively and the description thereof will be omitted.

As illustrated in FIG. 14, in a variance comparator 70, the variance value and mean value of the differential data P outputted from a differential image output circuit 30 and the variance value and mean value of the current image data outputted from a block converter 14c are obtained and compared with each other. As a result, a selector switch 68a is switched so that the output with smaller variance value can be inputted into a DCT circuit 62a. Incidentally, as the parameters of a DCT circuit 62a, a quantizer 64a, a variable length coder 66a and a multiplexer 60a should be switched between the differential data P outputted from the differential image output circuit 30 and the current image data outputted from the block converter 14c, these parameters are changed under the control of the variance comparator 70. Furthermore, in a multiplexer 60a, only when the differential data P outputted from the differential image output circuit 30 is selected by the switch 68a, the motion vector data outputted from the motion vector detector 40 is combined with the output from a variable length coder 66a.

Figure 15:
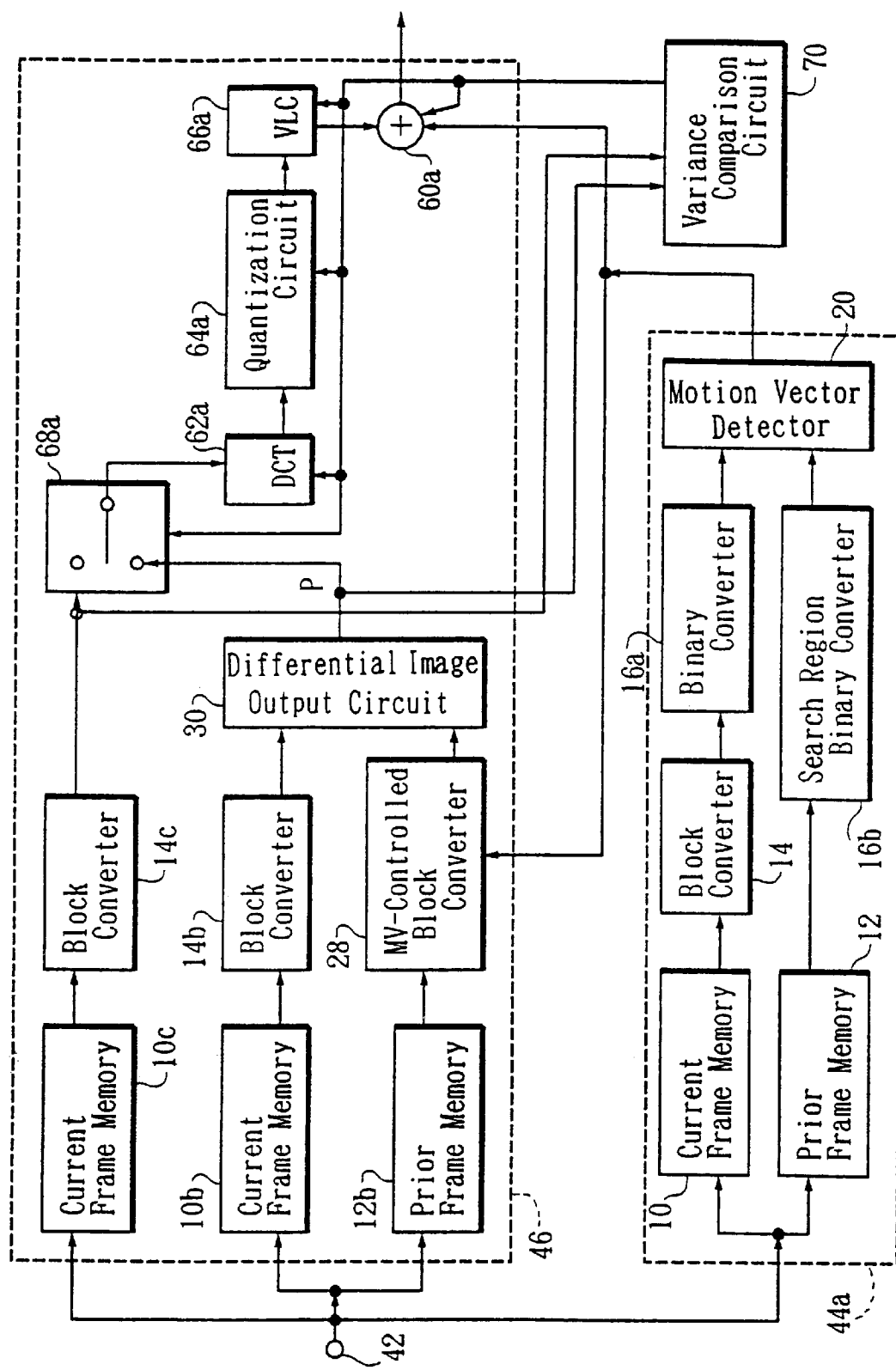
FIG. 15 is a block diagram illustrating a circuit according to the ninth embodiment.

(3-5) Ninth Embodiment: FIG. 15

In the ninth embodiment, instead of the upper bits extracting circuit 36 and 38 of the predictive data detector 44 of the above fifth embodiment (FIG. 11), a predictive data detector 44a provided with binary-coders 16a and 16b is adopted. And, as an adaptive coding circuit 46, the same circuit as that of the above eighth embodiment (FIG. 14) is adopted. In other words, either the differential data P or the current image data is selected under the control of the variance comparator 70 in the same way as the above eighth embodiment to output to the DCT circuit 62a. As the other parts of the composition are the same as those of the eighth embodiment, the same reference numerals will be allocated to the coincided parts respectively and the description thereof will be omitted.

In the binary-coder 16a, each pixel data (8-bits-data) of a current macroblock is converted to binary data (1-bit-data) by using a mean value of the pixel data of the current macroblock (16×16 pixels) as a threshold. In the binary-coder 16b, binary-converting is performed as to each pixel within the motion vector searching area (48×48 pixels centered around the coordinate position with respect to the current macroblock) by using the mean value of the pixel data within the motion vector searching area as a threshold.

In a motion vector detector 20, the binary data of a current macroblock outputted from the binary converter 16a is compared with the binary data of each 16×16-pixels-area within the motion vector searching area outputted from the binary converter 16b, the number of pixels whose values are coincident between the current macroblock and the each 16×16-pixel-area is counted, and the area which has the largest number of coincided pixels is selected as a reference macroblock. In this way, in the predictive data detector 44a, the region which has the smallest variance value of the differential data from the current macroblock is detected within the reference frame as a reference macroblock. This processing may increase the amount of the differential data P outputted from the differential image output circuit 30, on the other hand, may rise the flatness of the differential image P. As a consequence, the compression efficiency by the DCT circuit 62a is improved.

Furthermore, through processing as described above, the motion vector can be detected during fade-in with the gradual appearance of frames and fade-out with the gradual disappearance of frames.

(3-6) Tenth Embodiment: FIG. 16

In the tenth embodiment, the binary-coder 16b of the above ninth embodiment is substituted by a binary-coder 16c. In this binary-coder 16c, the each mean value of the pixel data of the each 16×16-pixels-area within the motion vector searching region is obtained, and the each mean value is used as a threshold for the binary-coding of the pixel data of the each 16×16-pixels-area within the motion vector searching range. Although the component of the circuit increases in complexity compared with the ninth embodiment, better images can be provided during the fade-in and the fade-out. As the other parts of the composition are the same as those of the above ninth embodiment, the same reference numerals will be allocated to the coincided parts respectively and the description thereof will be omitted.

(3-7) Evaluation of the Motion Vector Detection: FIGS. 17 through 22

In the last place, signal-to-noise ratios (SNRs) of images reproduced by the MPEG encoder illustrated in FIG. 3 is simulated. In the MPEG encoder, any one of TM, BR, AC, FS and TS is used as a technique for detecting a motion vector.

FIG. 18 illustrates the simulated SNRs of resultant images that a compressed motion video coded in accordance with the MPEG-2 standard was decoded by using the above techniques. The bit reduction (BR) and the this method (TM) are indicated with the number of upper bits after deletion of lower bits as abscissa. As a motion video (flower garden), a scene which moves at a constant speed in the horizontal direction was used. The output bit-rate was set to 4 Mbps. The motion vector searching range was plus or minus 16×16 pixels per frame as illustrated in FIG. 17.

In FIG. 18. "FS" indicates the SNR of the decoded image when the motion vector is detected by the FS method which has conventionally been used, "TS" indicates the SNR of the decoded image when the motion vector is detected by the TS method which has conventionally been examined by the MPEG and judged to be effective, "AC" indicates the SNR of the decoded image when the motion vector is detected in the same way as described as to FIG. 1, "BR" indicates the SNR of the decoded image when the motion vector is detected by the FS method by deleting the lower bits of the macroblock and the lower bits of the reference frame, and "TM" indicates the SNR of the decoded image when the motion vector is detected based on the number of coincident pixels between the macroblock with the upper bits extracted and the reference frame with the upper bits extracted.

As evident from FIG. 18, the SNR indicated by the BR method of lower 4 bits deletion is almost equivalent to the SNR indicated by the FS method. Although the SNR by the AC method is not being equivalent to the SNR by the FS method, the SNR by the AC method provides a better value compared with the SNR by the TS method. Both the TM method and the BR method can be as good as the TS method in the SNR if properly the number of bits to be extracted is appropriately selected.

Figure 20:
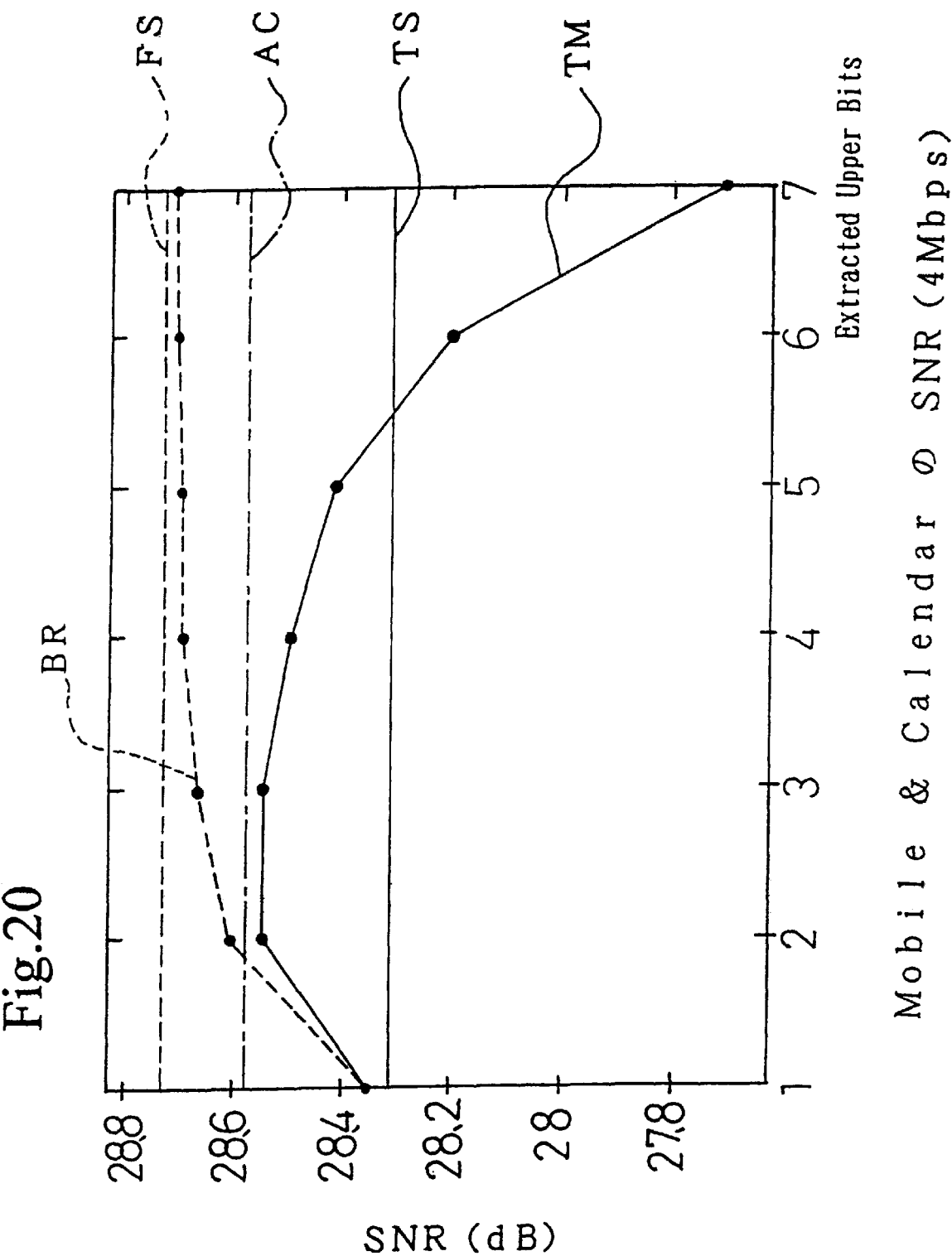
FIG. 20 is a characteristic diagram with respect to each detecting method illustrating the number of bits for the motion vector detection and SNR of the reproduced motion video of 4 Mbps in which a plural objects move at a constant speed.
Figure 21:
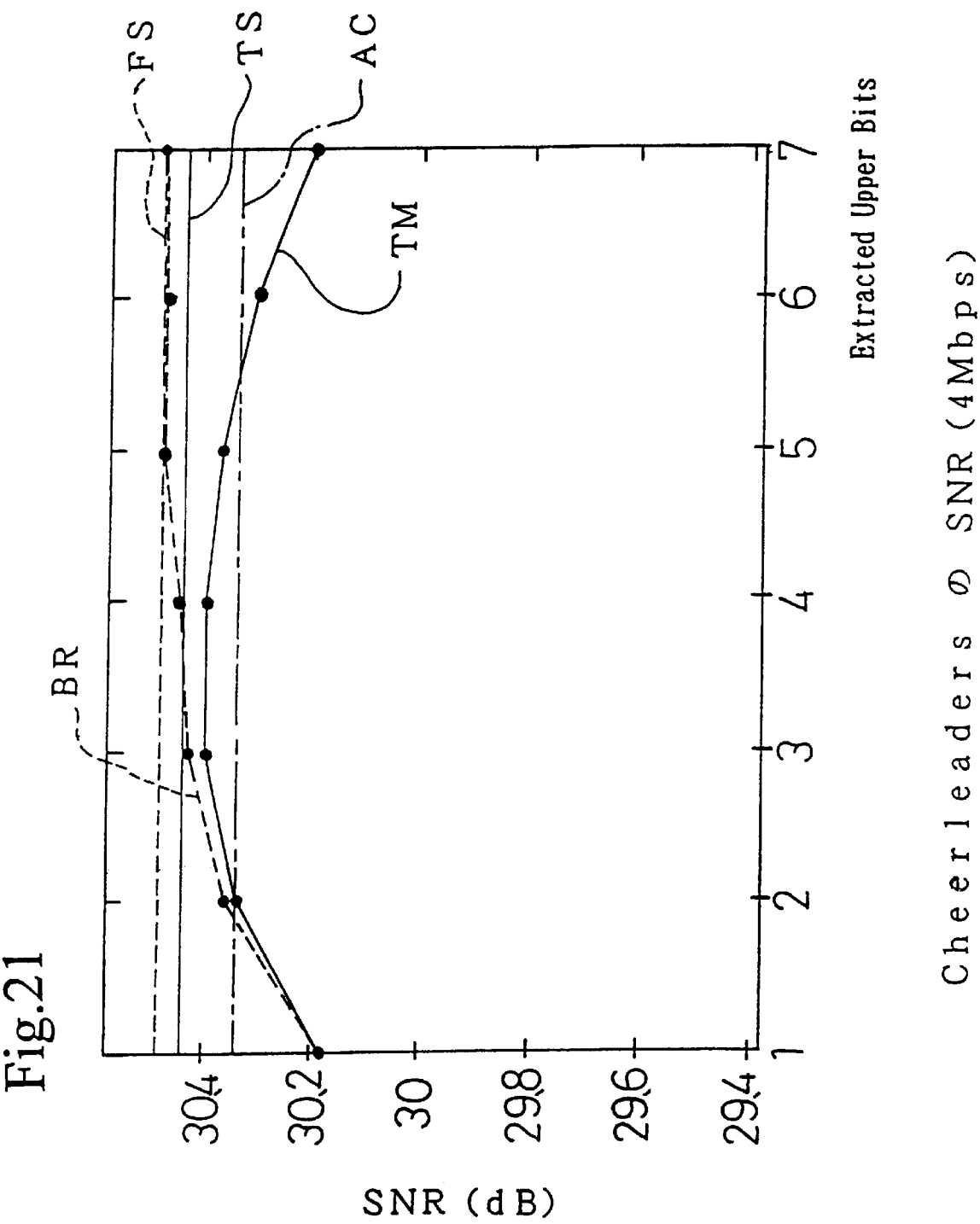
FIG. 21 is a characteristic diagram with respect to each detecting method illustrating the number of bits for the motion vector detection and SNR of the reproduced motion video of 4 Mbps in which there are many high-speed and random movements.
Figure 22:
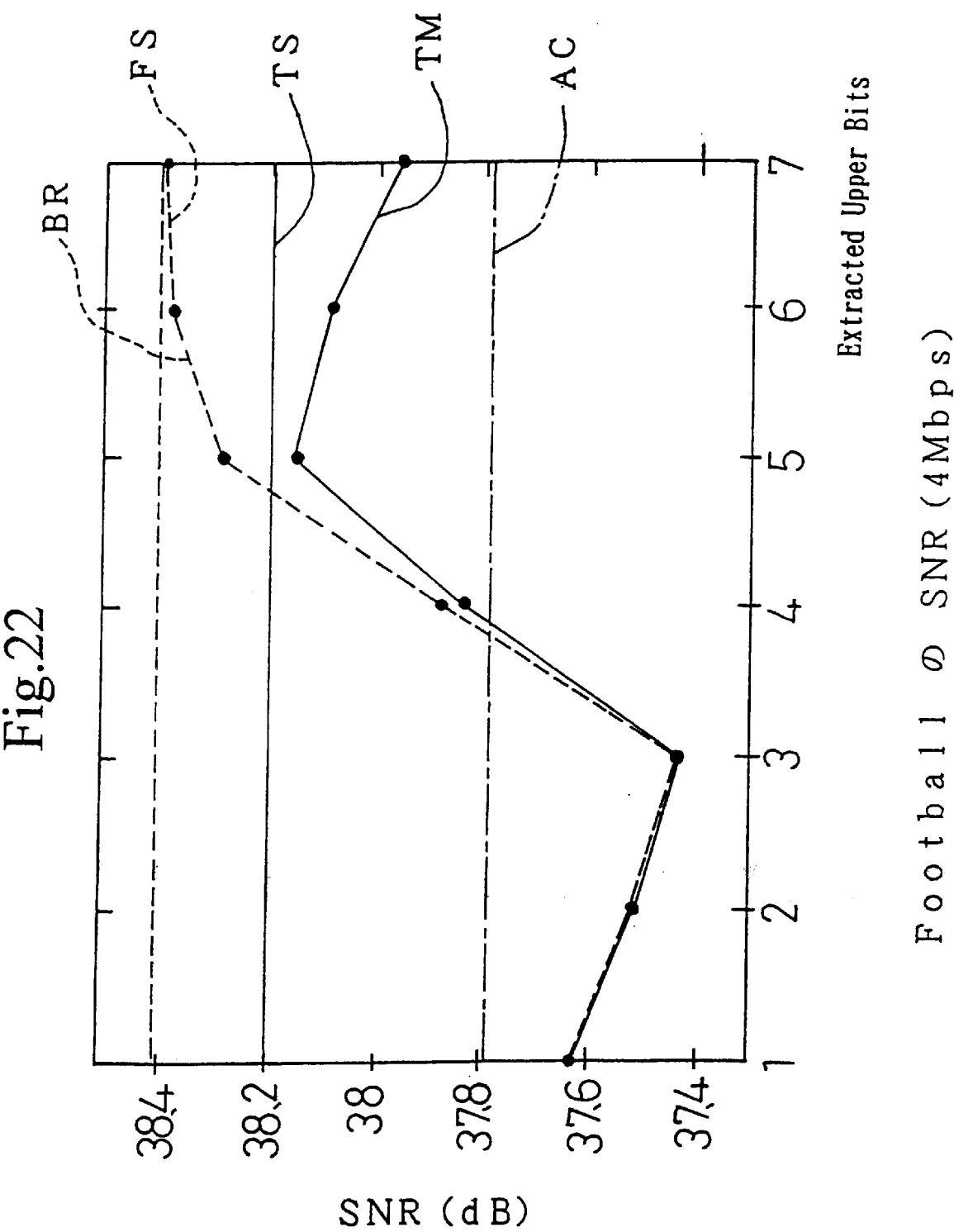
FIG. 22 is a characteristic diagram with respect to each detecting method illustrating the number of bits for the motion vector detection and SNR of the reproduced motion video of 4 Mbps which is very high in speed and less in high frequency terms.
Figure 23:
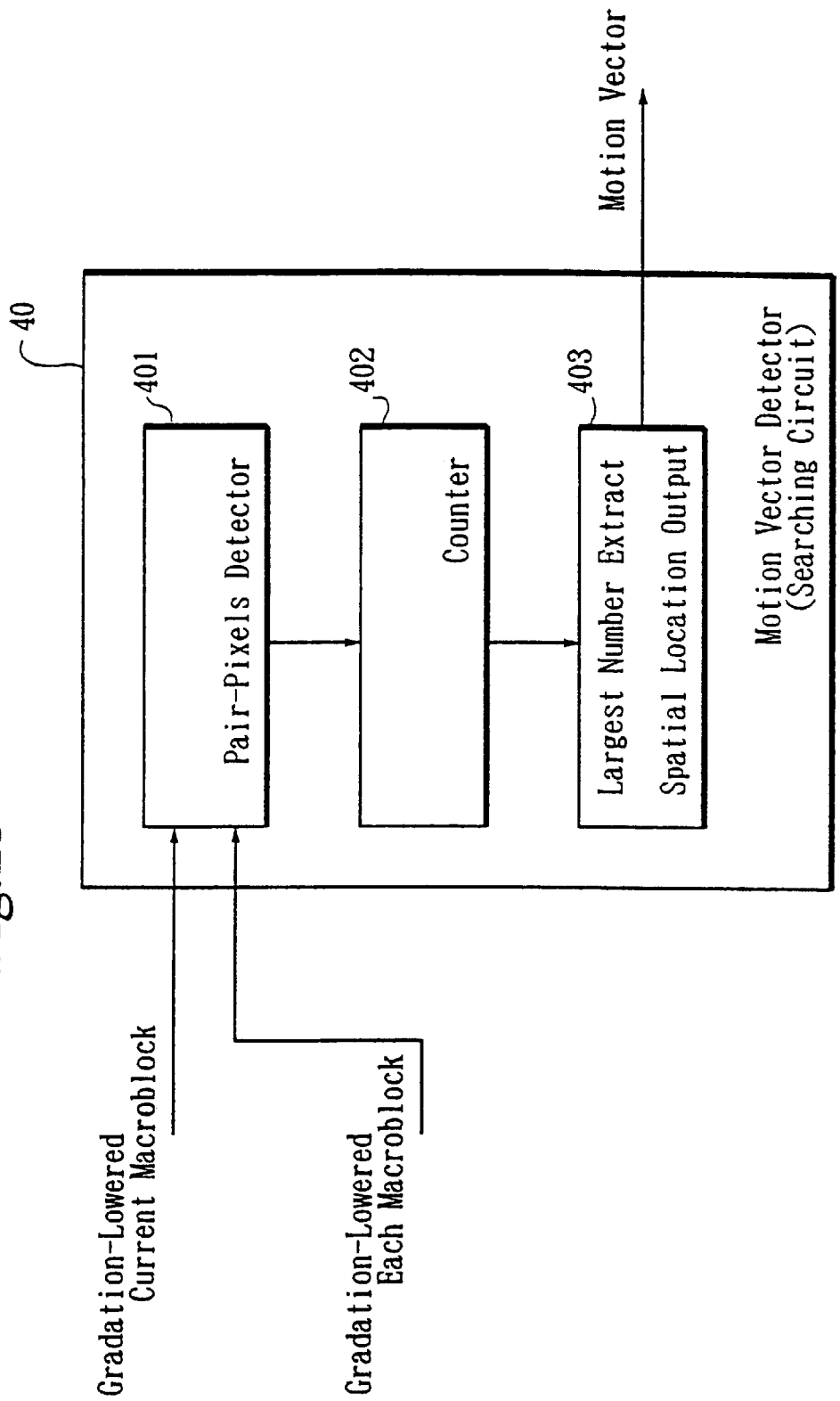
FIG. 23 is a block diagram illustrating an example of motion vector detector 40 of FIGS. 10, 11, 12, 13 and 14.
Figure 24:
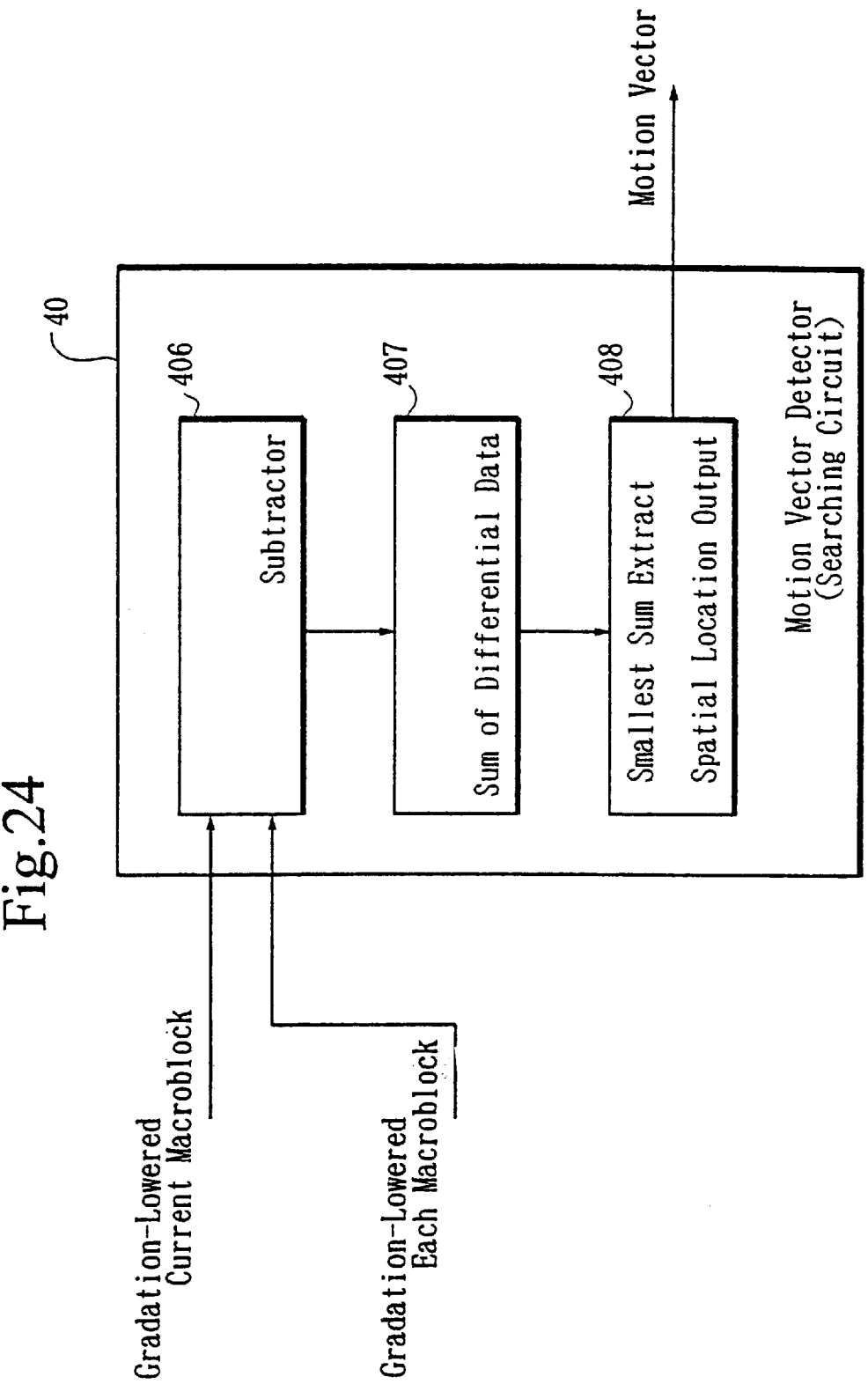
FIG. 24 is a block diagram illustrating an example of motion vector detector 40 of FIGS. 10, 11, 12, 13 and 14.

FIG. 19 illustrates a case where the image is the same as FIG. 18 and the bit-rate is 9 Mbps. FIG. 20 illustrates a motion video (mobile and calendar) of 4 Mbps in which a plurality of objects move at low speeds. FIG. 21 illustrates a motion video (cheer leaders) with many high-speed random motions. FIG. 22 illustrates a motion video (football) which is very high in speed and small in the number of high frequency terms.

In an example illustrated in FIG. 21, the TS method is generally superior to the AC method, the TM method and the BR method. As the SNR is high by all the methods, however, there is a little difference there among in practical use. In an example illustrated in FIG. 22, the TS method is generally superior to the AC method, the TM method and the BR method. As the SNR is high by all the methods, however, there is a little difference there among in practical use.

As evident from FIGS. 18 through 22, the TM method which performs the motion vector detection based on the number of coincided pixels of each image data reduced to the upper 4 bits can provide practically sufficient picture quality. As also evident from FIGS. 18 through 22, the BR method which performs the motion vector detection by fully searching for each image data reduced to the upper 4 bits can provide practically sufficient picture quality.

We claim:

1. A motion vector detecting circuit for detecting a motion vector which is directed from a spatial location of a current region within a current frame to a spatial location of a reference region within a reference frame, comprising:

means for extracting a pixel data of a specified rank in gradation within the current region to output threshold data;

a first binary-converting circuit for converting each pixel data of the current region into binary data by comparing with the threshold data;

a second binary-converting circuit for converting each pixel data of the reference frame into binary data by comparing with the threshold data; and means for searching the reference frame for an object region having a stronger correlation with the current region by comparing the binary converted data of the current region with the binary converted data of the reference frame to output a motion vector which is directed from the spatial location of the current region to the spatial location of the object region.

2. A motion vector detecting circuit according to claim 1, wherein said specified rank is a middle rank.

3. A motion vector detecting circuit for detecting a motion vector which is directed from a spatial location of a current region within a current frame to a spatial location of a reference region within a reference frame, comprising:

a first binary-converting circuit for converting each pixel data of the current region into binary data by comparing the each pixel data with another pixel data adjacent thereto;

a second binary-converting circuit for converting each pixel data of the reference frame into binary data by comparing the each pixel data with another pixel data adjacent thereto; and means for searching the reference frame for an object region having a stronger correlation with the current region by comparing the binary converted data of the current region with the binary converted data of the reference frame to output a motion vector which is directed from the spatial location of the current region to the spatial location of the object region.

4. A motion vector detecting circuit according to claim 3, wherein said first binary-converting circuit comprises:

means for converting each pixel data of the current frame into binary data by comparing the each pixel data with another pixel data adjacent thereto; and means for partitioning the binary-converted current frame into regions to output the current region.

5. A motion vector detecting circuit for detecting a motion vector which is directed from a spatial location of a current region within a current frame to a spatial location of a reference region within a reference frame, comprising:

a current frame binary-converting circuit for converting each pixel data of the current frame into binary data;

a partitioning circuit for partitioning the binary-converted current frame into regions to output the current region;

a reference frame binary-converting circuit for converting each pixel data of the reference frame into binary data; and a searching circuit for searching the reference frame for an object region having a stronger correlation with the current region by comparing the binary converted data of the current region with the binary converted data of the reference frame to output a motion vector which is directed from the spatial location of the current region to the spatial location of the object region.

6. A motion vector detecting circuit for detecting a motion vector which is directed from a spatial location of a current region within a current frame to a spatial location of a reference region within a reference frame, comprising:

a first lowering means for lowering gradation of the current region according to a standard fixed by characteristics of the current region;

a extracting means for extracting a search region in which a reference frame should be searched for a reference region based on the spatial location of the current region;

a second lowering means for lowering gradation of the search region according to the standard; and a searching circuit for searching the gradation-lowered search region for an object region having a stronger correlation with the current region by comparing the gradation-lowered current region with the gradation-lowered search region to output a motion vector which is directed from the spatial location of the current region to the spatial location of the object region..

7. A motion vector detecting circuit according to claim 6, wherein said standard is threshold data being used for binary-coding.

8. A motion video compressing system which transforms a motion video signal into a compressed bitstream, comprising:

a motion vector detecting circuit for detecting a motion vector which is directed from a spatial location of a current region within a current frame to a spatial location of a reference region within a reference frame, the spatial location of the reference region being obtained by searching the gradation-lowered reference frame for an object region having a stronger correlation with the current region by comparing the gradation-lowered current region with the gradation-lowered reference frame, the gradation-lowered current region being obtained by extracting upper bits from each pixel data of the current region, the gradation-lowered reference frame being obtained by extracting upper bits from each pixel data of the reference frame;

a transform-coding circuit for transform-coding inputted data into compressed data;

a subtracter for calculating a difference between each pixel data of the current region and each corresponding pixel data of the reference region directed by the motion vector to output each differential pixel data of a differential region;

a comparator for comparing an amount of data being obtained by the transform-coding the current region with an amount of data being obtained by the transform-coding the differential region; and a controller for controlling the transform-coding circuit such that the transform-coding circuit outputs which of the compressed current region and the compressed differential region has a smaller amount of data.

9. A motion video compressing system according to claim 8, wherein the transform-coding circuit comprises:

a DCT circuit for discrete cosine transforming a block of pixel data into a matrix of coefficient of frequency terms; and a quantizer for quantizing the coefficients.

10. A motion video compressing system according to claim 8, wherein said motion vector detecting circuit comprises:

a first extracting circuit for extracting upper bits from each pixel data of the current region to output the gradation-lowered current region;

a second extracting circuit for extracting upper bits from each pixel data of the reference frame to output the gradation-lowered reference frame;

a subtracter for calculating a difference between each pixel data of the gradation-lowered current region and each corresponding pixel data of gradation-lowered each region respectively which is divided from the gradation-lowered reference frame in specified order;

an adder for calculating a sum of the absolute value of the differential pixel data of the each differential region; and an output circuit for extracting an object region which has a smaller sum of the absolute value to output a motion vector which is directed from the spatial location of the current region to the spatial location of the object region.

11. A motion video compressing system according to claim 10, wherein the transform-coding circuit comprises:

a DCT circuit for discrete cosine transforming a block of pixel data into a matrix of coefficient of frequency terms; and a quantizer for quantizing the coefficients.

12. A motion video compressing system according to claim 8, wherein said motion vector detecting circuit comprises:

a first extracting circuit for extracting upper bits from each pixel data of the current region to output the gradation-lowered current region;

a second extracting circuit for extracting upper bits from each pixel data of the reference frame to output the gradation-lowered reference frame;

a detector for detecting pair-pixels whose both spatial coordinate in the region and data values are the same by comparing the gradation-lowered current region with the gradation-lowered each region respectively which is divided from the gradation-lowered reference frame in specified order;

a counter for counting the number of the pair-pixels within the gradation-lowered each region respectively; and an output circuit for extracting an object region which has a larger number of the pair-pixels to output a motion vector which is directed from the spatial location of the current region to the spatial location of the object region.

13. A motion video compressing system according to claim 12, wherein the transform-coding circuit comprises:

a DCT circuit for discrete cosine transforming a block of pixel data into a matrix of coefficient of frequency terms; and a quantizer for quantizing the coefficients.

14. A motion video coding system for inter-frame predictive coding a motion video signal into a compressed bitstream by using a motion vector, comprising:

a first binary-converting circuit for converting each pixel data of a current region within a current frame into binary data by comparing with the mean data thereof;

a extracting means for extracting a search region in which a reference frame should be searched for a reference region based on the spatial location of the current region;

a second binary-converting circuit for converting each pixel data of the search region into binary data by comparing with the mean data thereof; and a detector for detecting pair-pixels whose spatial coordinates in the region and data values are the same by comparing the binary-converted current region with the binary-converted each region respectively which is divided from the binary-converted search region in specified order;

a counter for counting the number of the pair-pixels within the binary-converted each region respectively; and an output circuit for extracting an object region which has a larger number of the pair-pixels to output a motion vector which is directed from the spatial location of the current region to the spatial location of the object region.

15. A motion video coding system for inter-frame predictive coding a motion video signal into a compressed bitstream by using a motion vector, comprising:

a first binary-converting circuit for converting each pixel data of a current region within a current frame into binary data by comparing with the mean data thereof;

a extracting means for extracting a search region in which a reference frame should be searched for a reference region based on the spatial location of the current region;

a second binary-converting circuit for converting each pixel data of an each region into binary data by comparing with the mean data thereof respectively, the each region being divided from the search region in specified order;

a detector for detecting pair-pixels whose spatial coordinate in the region and data values are the same by comparing the binary-converted current region with the binary-converted each region respectively;

a counter for counting the number of the pair-pixels within the each region respectively; and an output circuit for extracting an object region which has a larger number of the pair-pixels to output a motion vector which is directed from the spatial location of the current region to the spatial location of the object region.

16. A method for detecting a motion vector which is directed from a spatial location of a current region within a current frame to a spatial location of a reference region within a reference frame, comprising the steps of:

lowering gradation of the current region according to a standard fixed by characteristics of the current region;

extracting a search region in which a reference frame should be searched for a reference region based on the spatial location of the current region;

lowering gradation of the search region according to the standard; and searching the gradation-lowered search region for an object region having a stronger correlation with the current region and outputting a motion vector which is directed from the spatial location of the current region to the spatial location of the object region.

17. A method for detecting a motion vector according to claim 16, wherein said standard is threshold data being used for binary-coding.

* * * * *